US010126876B2

(12) United States Patent
Hashida et al.

(10) Patent No.: US 10,126,876 B2
(45) Date of Patent: Nov. 13, 2018

(54) TOUCH SENSOR ELECTRODE, TOUCH PANEL, AND DISPLAY DEVICE

(71) Applicant: VTS-Touchsensor Co. Ltd., Higashiomi-shi (JP)

(72) Inventors: Yasunori Hashida, Taito-ku (JP); Takahiro Harada, Taito-ku (JP); Kanae Bani, Taito-ku (JP)

(73) Assignee: VTS-Touchsensor Co. Ltd., Shigashiomi-shi (JP)

( * ) Notice: Subject to any disclaimer, the term of this patent is extended or adjusted under 35 U.S.C. 154(b) by 0 days.

(21) Appl. No.: 15/368,470

(22) Filed: Dec. 2, 2016

(65) Prior Publication Data

US 2017/0083160 A1 Mar. 23, 2017

Related U.S. Application Data

(63) Continuation of application No. PCT/JP2014/083437, filed on Dec. 17, 2014.

(30) Foreign Application Priority Data

Jun. 2, 2014 (JP) .................................. 2014-114461

(51) Int. Cl.
*G06F 3/041* (2006.01)
*G06F 3/044* (2006.01)
(Continued)

(52) U.S. Cl.
CPC ........ *G06F 3/0418* (2013.01); *G02F 1/13338* (2013.01); *G02F 1/134309* (2013.01);
(Continued)

(58) Field of Classification Search
CPC ............... G06F 3/0412; G06F 1/13338; G06F 1/136286; G06F 1/134309

See application file for complete search history.

(56) References Cited

U.S. PATENT DOCUMENTS 9,271,394 B2 2/2016 Ichiki
9,485,856 B2 11/2016 Ichiki
(Continued)

FOREIGN PATENT DOCUMENTS

JP 2012-103761 A 5/2012
JP 2012-185813 A 9/2012
(Continued)

OTHER PUBLICATIONS

International Search Report dated Mar. 24, 2015 in PCT/JP2014/083437, filed Dec. 17, 2014.

*Primary Examiner* — Liliana Cerullo
(74) *Attorney, Agent, or Firm* — Oblon, McClelland, Maier & Neustadt, L.L.P.

(57) ABSTRACT

A touch sensor electrode includes a transparent dielectric substrate, first electrodes each including first capacitive electrode parts, second electrodes each including second capacitive electrode parts, first dummy parts each including first dummy wires, and second dummy parts each including a plurality of second dummy wires. In plan view perpendicular to the transparent dielectric substrate, first capacitive electrode parts face respective second dummy parts, and second capacitive electrode parts face respective first dummy parts. A combination of first electrode wires and second dummy wires forms a first section of a lattice pattern, and the first electrode wires form line segments different from those formed by second dummy wires. A combination of second electrode wires and first dummy wires forms a second section of the lattice pattern, and the second electrode wires form line segments different from those formed by the first dummy wires.

20 Claims, 15 Drawing Sheets

(51) Int. Cl.
  *G02F 1/1333*  (2006.01)
  *G02F 1/1343*  (2006.01)
  *G02F 1/1362*  (2006.01)

(52) U.S. Cl.
  CPC ........ *G02F 1/136286* (2013.01); *G06F 3/044* (2013.01); *G06F 3/0412* (2013.01)

(56) References Cited

U.S. PATENT DOCUMENTS

| | | | | |
|---|---|---|---|---|
| 2011/0193817 A1* | 8/2011 | Byun | .................... | G06F 3/0418 345/174 |
| 2013/0242485 A1* | 9/2013 | Ohtani | .................... | G06F 3/041 361/679.01 |
| 2014/0049484 A1* | 2/2014 | Ra | ......................... | G06F 3/0412 345/173 |
| 2014/0054070 A1 | 2/2014 | Ichiki | | |

FOREIGN PATENT DOCUMENTS

| | | | |
|---|---|---|---|
| JP | 2012-230664 A | 11/2012 |
| JP | 2013-171454 A | 9/2013 |
| JP | 2014-074937 A | 4/2014 |

\* cited by examiner

TOUCH SENSOR ELECTRODE, TOUCH PANEL, AND DISPLAY DEVICE

CROSS-REFERENCE TO RELATED APPLICATIONS

The present application is a continuation of International Application No. PCT/JP2014/083437, filed Dec. 17, 2014, which is based upon and claims the benefits of priority to Japanese Application No. 2014-114461, filed Jun. 2, 2014. The entire contents of these applications are incorporated herein by reference.

BACKGROUND OF THE INVENTION

Field of the Invention

The present invention relates to a touch sensor electrode including a plurality of electrodes arranged along a first direction and a plurality of electrodes arranged along a second direction, a touch panel, and a display device.

Discussion of the Background

Touch panels mounted to display devices or mobile terminals include a plurality of first electrodes extending along an X-direction, which can be any direction, and a plurality of second electrodes extending along a Y-direction perpendicular to the X-direction. The plurality of first electrodes three-dimensionally intersect with the plurality of second electrodes. Between the plurality of first electrodes and the plurality of second electrodes, there is a transparent dielectric layer having a single-layer structure or a multi-layer structure. A change in the electrostatic capacitance between any one of the plurality of first electrodes and any one of the plurality of second electrodes is detected to determine an input position for the touch panel.

A need for improving the accuracy of detecting a position on a touch panel is more and more increasing along with the diversification of input forms to touch panels or the advancement of high resolution of display devices to which touch panels are mounted. In a proposal to meet such a need, the first electrodes each include a plurality of first capacitive electrode parts, each being in a diamond shape, arranged along the X-direction, and first connecting parts, each of which is smaller than each of the first capacitive electrode parts and connects between the first capacitive electrode parts adjacent to each other. Further, the second electrodes each include a plurality of second capacitive electrode parts, each being in a diamond shape, arranged along the Y-direction, and second connecting parts, each of which is smaller than each of the second capacitive electrode parts and connects between the second capacitive electrode parts adjacent to each other. When viewed from the front surface of the transparent dielectric layer, the first and second electrodes are disposed such that the first connecting parts overlap the second connecting parts, but the first capacitive electrode parts do not overlap the second capacitive electrode parts (e.g. see Patent Literature 1).

Patent Literature 1: JP-A-2012-230664

SUMMARY OF THE INVENTION

According to one aspect of the present invention, a touch sensor electrode includes a transparent dielectric substrate having a first surface and a second surface opposite to the first surface, first electrodes arrayed on the first surface along a second direction intersecting a first direction, each of the first electrodes being a set of first electrode wires, each of the first electrodes including first capacitive electrode parts arrayed along the first direction and first connecting parts each connecting between the first capacitive electrode parts adjacent to each other, second electrodes arrayed on the second surface along the first direction, each of the second electrodes being a set of second electrode wires, each of the second electrodes including a plurality of second capacitive electrode parts arrayed along the second direction and second connecting parts each connecting between the second capacitive electrode parts adjacent to each other, first dummy parts each including first dummy wires, each of the first dummy parts being separated from the first electrodes and located between two of the first electrodes adjacent to each other on the first surface, and second dummy parts each including second dummy wires, each of the second dummy parts being separated from the second electrodes and located between two of the second electrodes adjacent to each other on the second surface. In plan view perpendicular to the transparent dielectric substrate, the first capacitive electrode parts face respective second dummy parts, and the second capacitive electrode parts face respective first dummy parts. In the plan view, a combination of the first electrode wires and the second dummy wires forms a first section of a lattice pattern, and the first electrode wires form line segments different from line segments formed by the second dummy wires in the lattice pattern. In the plan view, a combination of the second electrode wires and the first dummy wires forms a second section of the lattice pattern, and the second electrode wires form line segments different from line segments formed by the first dummy wires in the lattice pattern.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
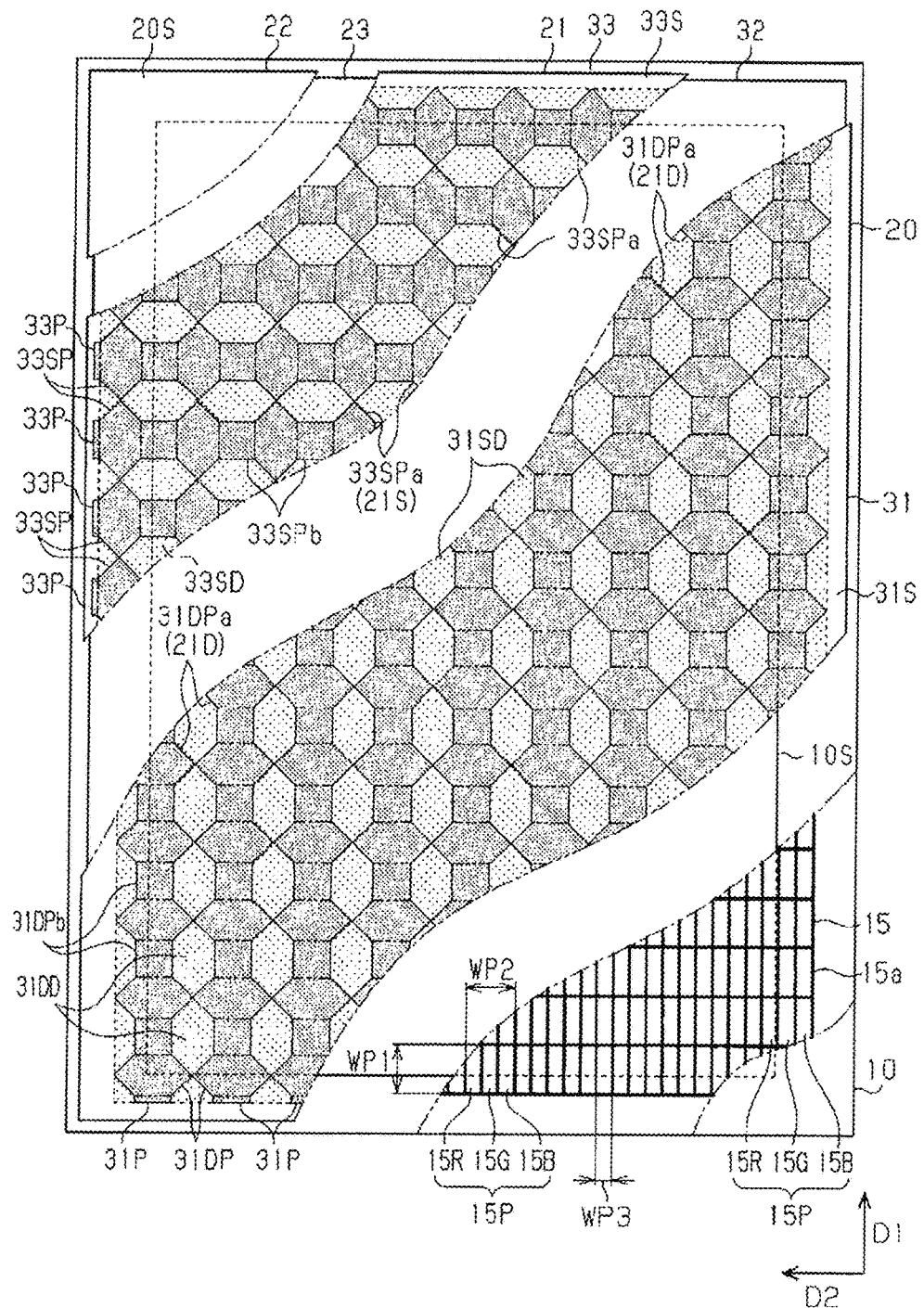
FIG. 1 is a plan view illustrating a planar structure of a display device according to a first embodiment, which embodies the present invention, or a diagram illustrating mutually different components being partially cut in layering order.

The embodiments will now be described with reference to the accompanying drawings, wherein like reference numerals designate corresponding or identical elements throughout the various drawings.

First Embodiment

With reference to FIGS. 1 to 9, a first embodiment embodying a touch sensor electrode, a touch panel, and a display device will be described. The following description is provided in the order of a configuration of a display device, an electrical configuration of the touch panel, a configuration of a drive electrode, a configuration of the touch sensor electrode, and advantageous effects of the touch sensor electrode.

Display Device

Referring to FIG. 1, a configuration of the display device will be described. FIG. 1 depicts the color filter layer provided to the display device, drive electrodes formed on a drive surface, and sensing electrodes formed on a sensing surface in an exaggerated manner for the sake of convenience in describing the configurations of the color filter layer, drive electrodes, and sensing electrodes. FIG. 1 schematically illustrates drive electrode wires provided to drive electrodes and sensing electrode wires provided to sensing electrodes.

In FIG. 1, a plurality of drive electrodes, a plurality of drive dummy parts, a plurality of sensing electrodes, and a plurality of sensing dummy parts are partially dotted for the sake of convenience in depicting the components.

As shown in FIG. 1, the display device is a laminate in which a display panel 10, that is a liquid crystal panel, for example, is bonded to a touch panel 20 via a transparent adhesive layer, and includes a drive circuit that drives the touch panel 20. The display panel 10 has a front surface where a display surface 10S formed into a rectangular shape is defined. The display surface 10S displays information, such as an image, based on external image data. On the precondition that the relative positions of the display panel 10 and the touch panel 20 are fixed using a different configuration, such as a casing, the transparent adhesive layer may be omitted.

The display panel 10 includes a color filter layer 15. The color filter layer 15 includes a black matrix 15a in a lattice shape configured of a plurality of lattice units arranged along a first direction D1, which can be any direction, and a second direction D2 perpendicular to the first direction D1. In the regions defined by the lattice units configuring the black matrix 15a, any of a red colored layer 15R for displaying red, a green colored layer 15G for displaying green, or a blue colored layer 15B for displaying blue is located.

On the color filter layer 15, for example, a plurality of red colored layers 15R, a plurality of green colored layers 15G, and a plurality of blue colored layers 15B are arranged along the second direction D2.

One pixel 15P includes one red colored layer 15R, one green colored layer 15G, and one blue colored layer 15B. The pixels 15P are arranged along the second direction D2, with the arrangement order of the red colored layer 15R, the green colored layer 15G, and the blue colored layer 15B in the second direction D2 being maintained. In each pixel 15P, the width along the first direction D1 is a first pixel width WP1, the width along the second direction D2 is a second pixel width WP2, and the width along the second direction D2 of each colored layer is a third pixel width WP3. The first pixel width WP1, the second pixel width WP2, and the third pixel width WP3 are set to respective values suitable for the resolution or the like of the display device.

The touch panel 20 is an electrostatic capacitive touch panel that is a laminate in which a touch sensor electrode 21 is bonded to a cover layer 22 through a transparent adhesive layer 23. The touch panel 20 transmits information displayed on the display panel 10. The cover layer 22 is formed of a glass substrate, a resin film, or the like. The cover layer 22 has a surface, which is opposite to the surface thereof facing the transparent adhesive layer 23, serving as a manipulation surface 20S of the touch panel 20. The transparent adhesive layer 23 has light transmission properties of transmitting an image displayed on the display surface 10S. For the transparent adhesive layer 23, a polyether adhesive or acrylic adhesive, for example, is used.

The touch sensor electrode 21 includes a component that is a transparent substrate 31 laid all over the display surface 10S formed on the display panel 10 to transmit information, such as an image, formed on the display surface 10S. The transparent substrate 31 is configured, for example, of a base material, such as a transparent glass substrate or a transparent resin film. The transparent substrate 31 may have a single-layer structure configured of one base material, or may have a multi-layer structure of two or more base materials being layered.

The transparent substrate 31 has a surface, which is opposite to the surface thereof facing the display panel 10, assigned as a drive surface 31S. On the drive surface 31S of the transparent substrate 31, a plurality of drive electrodes 31DP extend along the first direction D1, which can be any direction, while being arranged along the second direction perpendicular to the first direction D1. The drive electrode 31DP is an example of a first electrode.

Each of the drive electrodes 31DP is a set of a plurality of drive electrode wires, including a plurality of drive capacitive electrode parts 31DPa arrayed along the first direction D1 and drive connecting parts 31DPb each connecting the drive capacitive electrode parts 31DPa adjacent to each other. Of the plurality of drive capacitive electrode parts 31DPa, one located at an end in the first direction D1 is connected to a pad 31P which is connected to a selection circuit. The drive electrode wire is an example of a first electrode wire, the drive capacitive electrode part 31DPa is an example of a first capacitive electrode part, and the drive connecting part 31DPb is an example of a first connecting part.

On the drive surface 31S, drive dummy parts 31DD including a plurality of drive dummy wires are located. The drive dummy parts 31DD are located between the drive electrodes 31DP adjacent to each other on the drive surface 31S, while being located apart from the drive electrodes 31DP. The drive dummy part 31DD is an example of a first dummy part, and the drive dummy wire is an example of a first dummy wire.

In each of the drive electrodes 31DP, each drive capacitive electrode part 31DPa has a hexagonal shape, for example. Each drive connecting part 31DPb has a rectangular shape, and shares one side of one of the drive capacitive electrode parts 31DPa adjacent to each other in the first direction D1 and one side of the other drive capacitive electrode part 31DPa, for example.

The drive capacitive electrode parts 31DPa adjacent to each other in the second direction D2 are arrayed in the state where one vertex of one hexagon faces one vertex of the adjacent hexagon, without being electrically connected to each other. Thus, hexagonal regions are defined between two drive electrodes 31DP adjacent to each other in the second direction D2, each region being surrounded by four drive capacitive electrode parts 31DPa and two drive connecting parts 31DPb and, in the defined regions, the drive dummy parts 31DD are respectively located. Thus, the plurality of drive dummy parts 31DD are arrayed along the second direction D2.

Materials that can be used for forming the drive electrodes 31DP include a metal film such as of copper or aluminum. The drive electrodes 31DP are individually connected to the selection circuit to receive drive signals supplied from the selection circuit, for selection by the selection circuit.

The drive surface 31S and the plurality of drive electrodes 31DP are bonded to a transparent dielectric substrate 33 through a transparent adhesive layer 32. The transparent adhesive layer 32 has light transmission properties of transmitting information, such as an image, displayed on the display surface 10S, and bonds the drive surface 31S and the plurality of drive electrodes 31DP to the transparent dielectric substrate 33. Materials that can be used for the transparent adhesive layer 32 include, for example, a polyether adhesive, an acrylic adhesive, and the like. The transparent dielectric substrate 33, that is an example of a transparent dielectric layer, has a back surface where the plurality of drive electrodes 31DP are arrayed, the back surface being the surface facing the transparent substrate 31.

The transparent dielectric substrate 33 is configured of, for example, a base material, such as a transparent resin film made of polyethylene terephthalate or the like, or a transparent glass substrate. The transparent dielectric substrate 33 may have a single-layer structure configured of one base material, or may have a multi-layer structure of two or more base materials being layered. The transparent dielectric substrate 33 has light transmission properties of transmitting information, such as an image, displayed on the display surface 10S, and has a relative dielectric constant suited to detecting the electrostatic capacitance across the electrodes. The transparent dielectric substrate 33 and the transparent substrate 31 are an example of a transparent dielectric layer.

The transparent dielectric substrate 33 has a surface, which is opposite to the surface thereof facing the transparent adhesive layer 32, assigned as a sensing surface 33S. On the sensing surface 33S of the transparent dielectric substrate 33, a plurality of sensing electrodes 33SP extend along the second direction D2, while being arrayed along the first direction D1 perpendicular to the second direction D2. The sensing electrode 33SP is an example of a second electrode, the sensing surface 33S is an example of a second surface, and the surface of the transparent dielectric substrate 33 opposite to the surface thereof facing the sensing surface 33S is an example of a first surface.

Each of the sensing electrodes 33SP is a set of a plurality of sensing electrode wires, including a plurality of sensing capacitive electrode parts 33SPa arrayed along the second direction D2 and sensing connecting parts 33SPb each connecting the sensing capacitive electrode parts 33SPa adjacent to each other. Of the plurality of sensing capacitive electrode parts 33SPa, one located at an end in the second direction D2 is connected to a pad 33P connected to a measurement circuit. The sensing capacitive electrode part 33SPa is an example of a second capacitive electrode part, and the sensing connecting part 33SPb is an example of a second connecting part.

On the sensing surface 33S, sensing dummy parts 33SD including a plurality of sensing dummy wires are located. The sensing dummy parts 33SD are located between the sensing electrodes 33SP adjacent to each other on the sensing surface 33S, while being located apart from the sensing electrodes 33SP. The sensing dummy part 33SD is an example of a second dummy part, and the sensing dummy wire is an example of a second dummy wire.

In plan view perpendicular to the sensing surface 33S, the drive capacitive electrode parts 31DPa face the respective sensing dummy parts 33SD, and the sensing capacitive electrode parts 33SPa face the respective drive dummy parts 31DD.

In plan view perpendicular to the sensing surface 33S, the drive electrode wires of the drive capacitive electrode parts 31DPa and the sensing dummy wires of the sensing dummy parts 33SD configure mutually intersecting separate line segments, and a combination of the drive electrode wires of the drive capacitive electrode parts 31DPa with the sensing dummy wires of the sensing dummy parts 33SD configures drive sections 21D in a lattice pattern. In the lattice pattern, one lattice unit has a square shape. The drive section 21D is an example of a first section of the lattice pattern. In plan view perpendicular to the sensing surface 33S, the sensing electrode wires of the sensing capacitive electrode parts 33SPa and the drive dummy wires of the drive dummy parts 31DD configure mutually intersecting separate line segments, and a combination of the sensing electrode wires of the sensing capacitive electrode parts 33SPa and the drive dummy wires of the drive dummy parts 31DD configures sensing sections 21S, which are different from the above drive sections 21D of the lattice pattern. The sensing section 21S is an example of a second section of the lattice pattern.

In each of the sensing electrodes 33SP, each sensing capacitive electrode part 33SPa has a hexagonal shape, for example. The sensing connecting part 33SPb has a rectangular shape, for example, and shares one side of one of the sensing capacitive electrode parts 33SPa adjacent to each other in the second direction D2 and one side of the other sensing capacitive electrode part 33SPa. Each sensing capacitive electrode part 33SPa has a shape and a size equal to those of a drive dummy part 31DD, while each sensing connecting part 33SPb has a shape and a size equal to those of a drive connecting part 31DPb.

The sensing capacitive electrode parts 33SPa adjacent to each other in the first direction D1 are arrayed in the state where one vertex of a hexagon faces one vertex of the adjacent hexagon, without being electrically connected to each other. Thus, hexagonal regions are defined between two sensing electrodes 33SP adjacent to each other in the first direction D1, each region being surrounded by four sensing capacitive electrode parts 33SPa and two sensing connecting parts 33SPb and, in the defined regions, the sensing dummy parts 33SD are respectively located. Thus, the plurality of sensing dummy parts 33SD are arrayed along the first direction D1. Each sensing dummy part 33SD has a shape and a size equal to those of a drive capacitive electrode part 31DPa.

In the touch sensor electrode 21, one drive connecting part 31DPb overlaps one sensing connecting part 33SPb, in plan view perpendicular to the sensing surface 33S.

Similar to the above-described drive electrode 31DP, materials that can be used for forming the sensing electrodes 33SP include a metal film such as of copper or aluminum. The sensing electrodes 33SP are individually connected to a detection circuit so that the voltage of each of the sensing electrodes 33SP is detected by the detection circuit. The touch sensor electrode 21, the selection circuit, and the detection circuit are an example of a touch sensor.

The sensing surface 33S and the plurality of sensing electrodes 33SP are bonded to the cover layer 22 through the transparent adhesive layer 23 mentioned above.

Figure 2:
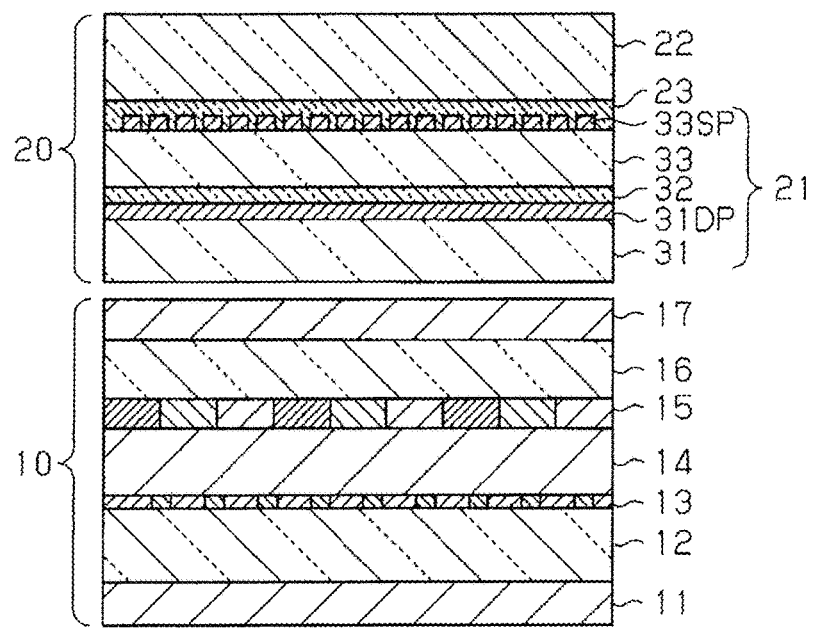
FIG. 2 is a cross-sectional view illustrating a cross-sectional structure of the display device of FIG. 1.

Specifically, as shown in FIG. 2, the touch panel 20 includes the following components located in the order of nearest to farthest from the display panel 10, the components being the transparent substrate 31, the drive electrodes 31DP, the transparent adhesive layer 32, the transparent dielectric substrate 33, the sensing electrodes 33SP, the transparent adhesive layer 23, and the cover layer 22. Among them, the transparent dielectric substrate 33 is sandwiched between the plurality of drive electrodes 31DP and the plurality of sensing electrodes 33SP.

The transparent adhesive layer 32 is located between the drive electrodes 31DP and the transparent dielectric substrate 33, covering the drive electrode wires configuring the drive electrodes 31DP and filling between adjacent drive electrode wires. The transparent adhesive layer 23 is located between the sensing electrodes 33SP and the cover layer 22, covering the sensing electrode wires configuring the sensing electrode 33SP and filling between adjacent sensing electrode wires. Of these components, at least one of the transparent adhesive layer 23 and the transparent substrate 31 may be omitted.

The display panel 10 includes, a plurality of components configuring the display panel 10 arranged in the order of farthest to nearest from the touch panel 20 as set forth below. Specifically, in the order of farthest to nearest from the touch panel 20, the components located are a lower polarizer 11, a thin film transistor (in the following, referred to as TFT) substrate 12, a TFT layer 13, a liquid crystal layer 14, the color filter layer 15, a color filter substrate 16, and an upper polarizer 17. Among them, the TFT layer 13 includes pixel electrodes configuring subpixels, which are arranged in a matrix pattern. In the color filter layer 15, the black matrix 15a defines a plurality of regions, each of which is in a rectangular shape, facing respective subpixels. Each of the regions defined by the black matrix 15a includes the above-mentioned colored layer that converts white light into any one of red, green, or blue light.

A liquid crystal panel is an example of the display panel 10. The display panel 10 does not necessarily have to be a liquid crystal panel, but may be an organic EL panel, for example.

In a configuration omitting the transparent adhesive layer 23, the surface of the cover layer 22 facing the transparent dielectric substrate 33 may be assigned as the sensing surface 33S, and the plurality of sensing electrodes 33SP may be formed by patterning one thin film formed on the sensing surface 33S.

The touch panel 20 may be fabricated using a method of bonding the touch sensor electrode 21 to the cover layer 22 via the transparent adhesive layer 23, or may be fabricated using the following method as an example different from the above method. Specifically, in the method, a thin film layer formed of a conductive metal, such as copper, is formed on the cover layer 22, such as a resin film, directly or via a base layer, and a resist layer having a pattern of the sensing electrode is formed on the thin film layer. Subsequently, the thin film layer is processed into a plurality of sensing electrodes 33SP by wet etching using ferric chloride or the like, thereby obtaining a first film. Similar to the sensing electrodes 33SP, a thin film layer formed on another resin film is processed into a plurality of drive electrodes 31DP, thereby obtaining a second film. The first and second films are bonded to the transparent dielectric substrate 33 via the transparent adhesive layers so as to sandwich the transparent dielectric substrate 33.

Electrical Configuration of the Touch Panel

Figure 3:
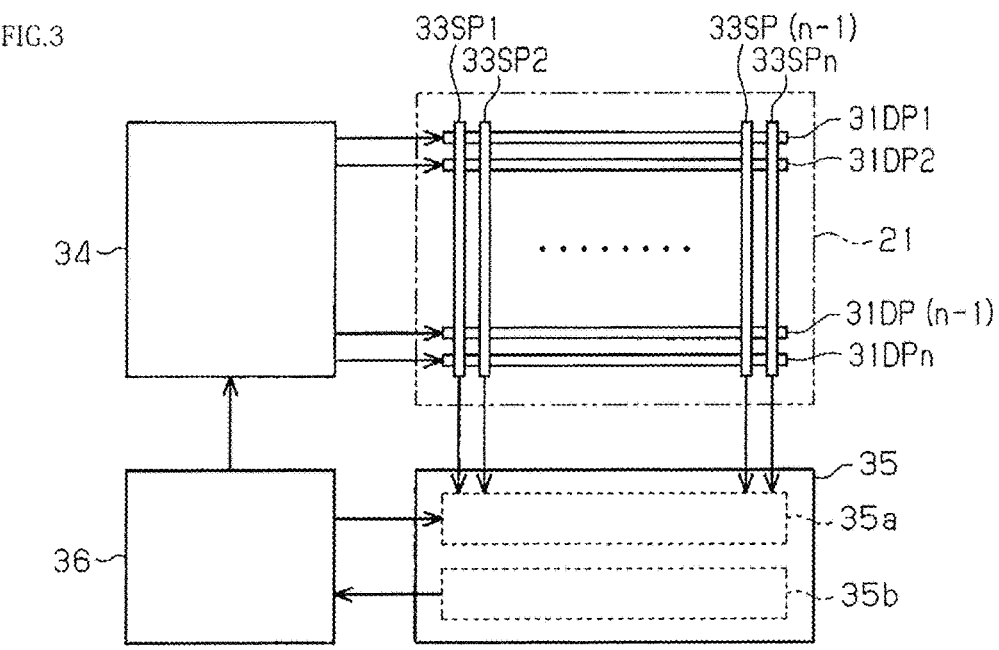
FIG. 3 is a block diagram illustrating an electrical configuration of a touch panel of the display device of FIG. 1.

Referring to FIG. 3, the electrical configuration of the touch panel 20 will be described. In the following description, the touch panel 20 of electrostatic capacitive type will be described taking as an example the electrical configuration of the touch panel 20 of mutual capacitive type.

As shown in FIG. 3, the touch panel 20 includes a selection circuit 34, a detection circuit 35, and a control unit 36. The selection circuit 34 can be connected to the plurality of drive electrodes 31DP. The detection circuit 35 can be connected to the plurality of sensing electrodes 33SP. The control unit 36 is connected to the selection circuit 34 and the detection circuit 35.

The control unit 36 generates and outputs a start timing signal for causing the selection circuit 34 to start generation of drive signals for the drive electrodes 31DP. The control unit 36 generates and outputs a scanning timing signal for causing the selection circuit 34 to sequentially scan targets, to which the drive signals are supplied, from a first drive electrode 31DP to an nth drive electrode 31DP.

On the other hand, the control unit 36 generates and outputs a start timing signal for causing the detection circuit 35 to detect electric current passing through the sensing electrodes 33SP. The control unit 36 generates and outputs a scanning timing signal for causing the detection circuit 35 to sequentially scan targets from a first sensing electrode 33SP to an nth sensing electrode 33SP.

The selection circuit 34 starts generation of drive signals on the basis of the start timing signal outputted from the control unit 36, and scans the output destinations of the drive signals from the first drive electrode 31DP1 to the nth drive electrode 31DPn on the basis of the scanning timing signal outputted from the control unit 36.

The detection circuit 35 includes a signal acquiring section 35a and a signal processing section 35b. Based on the start timing signal outputted from the control unit 36, the signal acquiring section 35a starts acquisition of electric current signals, which are analog signals, generated at the sensing electrodes 33SP. Based on the scanning timing signal outputted from the control unit 36, the signal acquiring section 35a scans the acquisition sources of the electric current signals from the first sensing electrode 33SP1 to the nth sensing electrode 33SPn.

The signal processing section 35b processes the electric current signals acquired by the signal acquiring section 35a to generate a voltage signal, which is a digital value, and outputs the generated voltage signal to the control unit 36. In this way, the selection circuit 34 and the detection circuit 35 generate voltage signals from electric current signals which vary with the change of electrostatic capacitance to measure a change in electrostatic capacitance across the drive electrodes 31DP and the sensing electrodes 33SP. The selection circuit 34 and the detection circuit 35 are an example of a peripheral circuit.

The control unit 36 detects a touch position of a user's finger or the like on the touch panel 20 on the basis of the voltage signal outputted from the signal processing section 35b.

The touch panel 20 is not limited to the touch panel 20 of mutual capacitance type described above, but may be a touch panel of self-capacitance type.

Configuration of the Drive Electrodes

Figure 4:
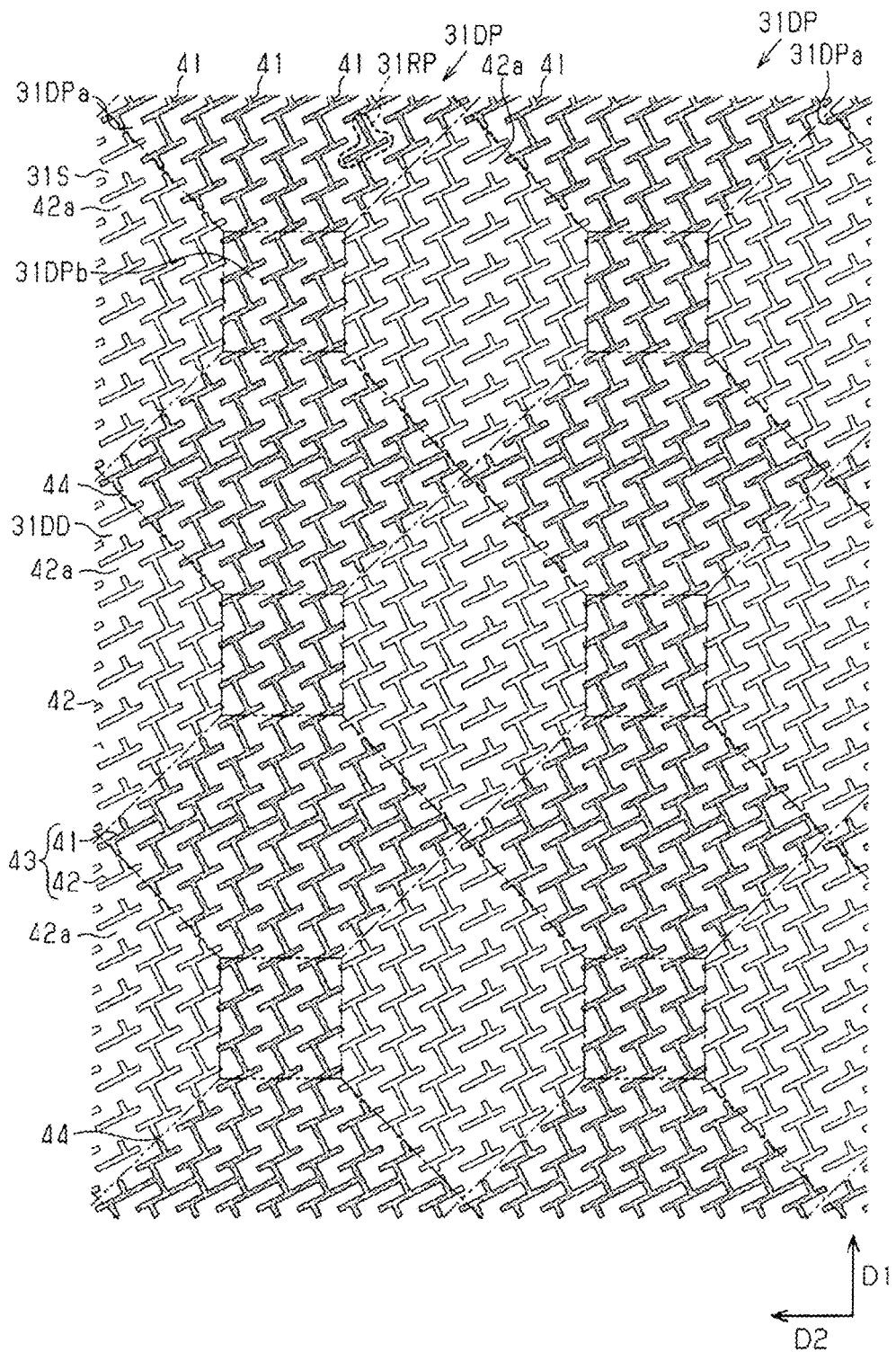
FIG. 4 is a plan view illustrating an arrangement of drive electrode wires of the display device of FIG. 1.
Figure 5:
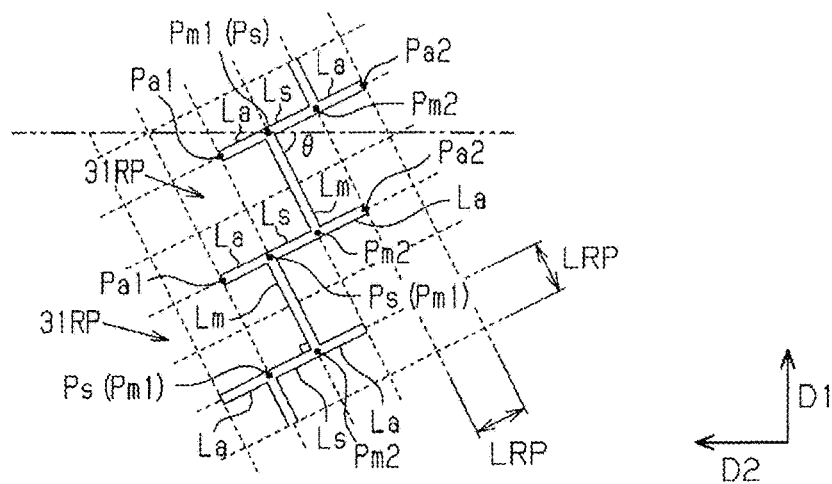
FIG. 5 is a partially enlarged view illustrating reference pattern elements included in a drive electrode of FIG. 4.
Figure 6:
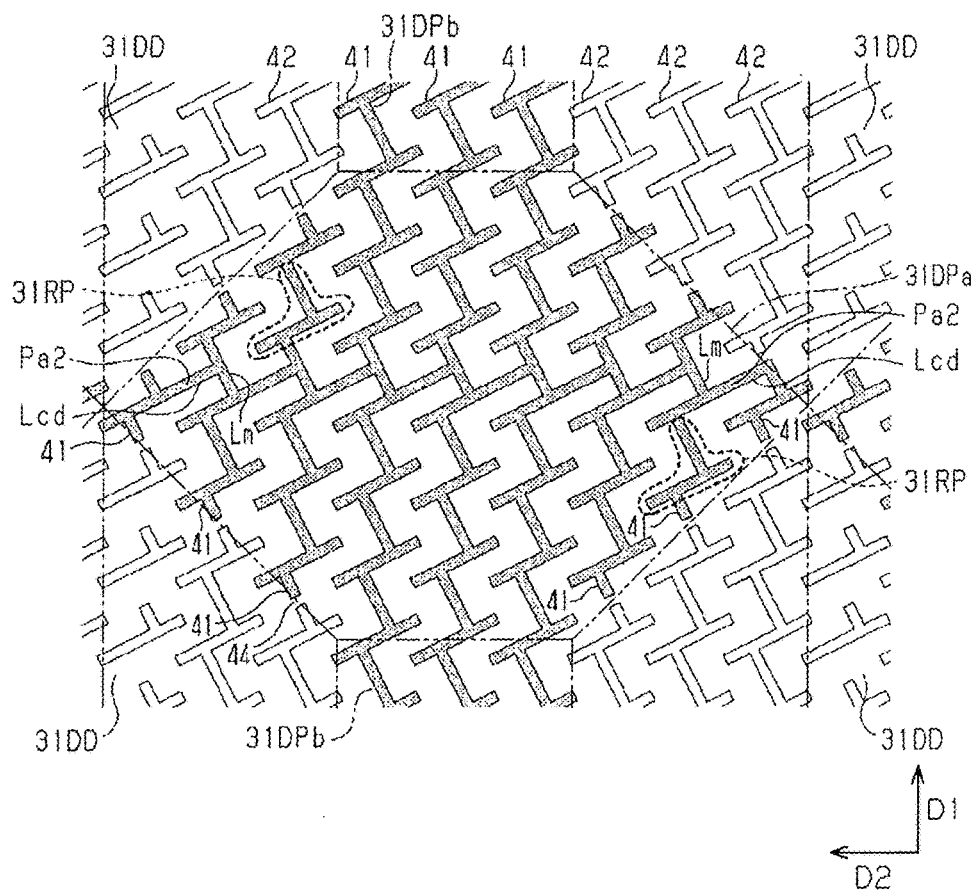
FIG. 6 is a partially enlarged view illustrating part of the drive electrode of FIG. 4.

Referring to FIGS. 4 to 6, a configuration of the drive electrodes will be described. In FIG. 4, the width of each of the plurality of drive electrode wires configuring each of the drive electrodes 31DP is exaggeratedly depicted for the sake of convenience in describing the arrangement of the drive electrode wires.

As shown in FIG. 4, one drive electrode 31DP includes a plurality of drive capacitive electrode parts 31DPa arrayed along the first direction D1 and the drive connecting parts 31DPb each connecting two drive capacitive electrode parts 31DPa adjacent to each other. The plurality of drive electrodes 31DP are arrayed along the second direction D2.

In each drive electrode 31DP, each of the drive capacitive electrode parts 31DPa and each of the drive connecting parts 31DPb are configured of a plurality of drive electrode wires 41. Each drive electrode 31DP is a set of a plurality of drive electrode wires 41. Each drive electrode wire 41 includes a plurality of reference pattern elements 31RP in a pattern which is determined with reference to the second direction D2, as a reference direction, determined in the drive electrodes 31DP, for example.

Each drive capacitive electrode part 31DPa has nine drive electrode wires 41, for example, arrayed being equally spaced along the second direction D2, with each of the drive electrode wires 41 extending along the first direction D1. Each drive connecting part 31DPb has three drive electrode wires 41, for example, arrayed being equally spaced along the second direction D2, with each of the drive electrode wires 41 extending along the first direction D1.

Of the nine drive electrode wires 41 configuring the drive capacitive electrode part 31DPa, three located at the center in the second direction D2 are respectively connected to the three drive electrode wires 41 configuring the drive connecting part 31DPb. Thus, in one drive electrode 31DP, three drive electrode wires 41 continuously extending along the first direction D1 are located at the center in the second direction D2.

On the other hand, of the drive electrode wires 41 configuring the drive capacitive electrode part 31DPa, six that are different from the three located at the center in the second direction D2 are configured as follows.

In the six drive electrode wires 41, the length along the first direction D1 becomes smaller as the distance from the center of the drive capacitive electrode part 31DPa becomes larger in the second direction D2. In each of the six drive electrode wires 41, the length along the first direction D1 is shorter than the length of the drive electrode wires 41 located at the center by the same length at both ends in the first direction D1. Thus, the drive capacitive electrode part 31DPa has a hexagonal outer shape as defined by the end portions of the drive electrode wires 41.

In contrast to this, in the three drive electrode wires 41 configuring the drive connecting part 31DPb, the length along the first direction D1 is substantially equal to the total width of the three drive electrode wires 41 along the second direction D2.

The drive dummy parts 31DD are located between two drive electrodes 31DP adjacent to each other in the second direction D2. Each drive dummy part 31DD is located between two contiguous drive capacitive electrode parts 31DPa of one of the drive electrodes 31DP and two contiguous drive capacitive electrode parts 31DPa of the other drive electrode 31DP.

The drive dummy part 31DD includes six drive dummy wires 42, for example, arrayed being equally spaced along the second direction D2, with each of the drive dummy wires 42 extending along the first direction D1. Each drive dummy wire 42 includes a plurality of reference pattern elements 31RP which are in a pattern determined with reference to the second direction D2.

In the six drive dummy wires 42, the width along the first direction D1 is the largest in two drive dummy wires 42 located at the center in the second direction D2, and becomes smaller towards both ends of the drive dummy part 31DD in the second direction D2. Two drive dummy wires 42 sandwiching the two drive dummy wires 42 at the center in the second direction D2 and equally distanced from the center in the second direction D2 have an equal length along the first direction D1. In each of four drive dummy wires 42 different from the two drive dummy wires 42 located at the center in the second direction D2, the length along the first direction D1 is shorter than the drive dummy wires 42 located at the center by the same length at both ends in the first direction D1.

Thus, each drive dummy part 31DD has a hexagonal outer shape defined by the end portions of the drive dummy wires 42.

Of the drive dummy wires 42 included in one drive dummy part 31DD, one of the drive dummy wires 42 located at the center in the second direction D2 has a plurality of intra-dummy gaps 42a which are equally spaced along the first direction D1. The plurality of intra-dummy gaps 42a are located along the first direction D1 and the second direction D2 for each of the drive dummy parts 31DD.

In the first direction D1, the drive dummy parts 31DD and part of the drive capacitive electrode parts 31DPa are alternately and continuously arrayed. In part of the drive surface 31S, the drive dummy wires 42 configuring the drive dummy parts 31DD and the drive electrode wires 41 configuring the drive capacitive electrode parts 31DPa are alternately and continuously arrayed in the first direction D1. The plurality of drive electrode wires 41 and the plurality of drive dummy wires 42, which are alternately contiguous in the first direction D1, configure a drive pattern group 43. The drive electrode wire 41 and the drive dummy wire 42 adjacent to each other in the first direction D1 include part of a common reference pattern element 31RP.

In the drive pattern group 43, a drive gap 44 is provided between an end portion of a drive electrode wire 41 and an end portion of a drive dummy wire 42 in the first direction D1. The drive gap 44 separates the drive electrode wire 41 from the drive dummy wire 42. Thus, the drive dummy part 31DD is separated from the drive electrode 31DP. In other words, the drive dummy wire 42 is electrically insulated from the drive electrode 31DP.

The material forming the drive electrode wire 41 and the drive dummy wire 42 is copper, for example, among the metals mentioned above. In plan view perpendicular to the sensing surface 33S, the drive electrode wires 41 and the drive dummy wires 42 have the same hue, black, for example.

The drive electrode wires 41 and the drive dummy wires 42 are blackened through black oxide treatment of a metal thin film for forming the drive electrode wires 41 and the drive dummy wires 42. Alternatively, the drive electrode wires 41 and the drive dummy wires are black-oxide treated 42 so as to be blackened. Examples of the black oxide treatment include oxidation, plating for providing a black metal film, or the like.

Referring to FIGS. 5 and 6, the reference pattern elements 31RP configuring the drive electrode wires 41 and the drive dummy wires 42 will be described. FIG. 5 is a partially enlarged view illustrating part of a drive electrode wire 41 shown in FIG. 4. In FIG. 5, the width of the electrode wire is exaggeratedly depicted for the sake of convenience in describing the arrangement of the electrode wires configuring the reference pattern element 31RP.

As shown in FIG. 5, the reference pattern element 31RP includes a primary wire Lm and a secondary wire Ls. The primary wire Lm is in a linear shape extending along an extending direction forming a primary wire angle $\theta$ that is a predetermined angle relative to the second direction D2 that is a reference direction of the drive electrode 31DP. The primary wire Lm extends from a first primary end point Pm1 to a second primary end point Pm2. The primary wire angle $\theta$ is a predetermined angle within an angle range of greater than 0° and smaller than 180°, for example, and preferably a predetermined angle within an angle range of 45° or more to 135° or less, and more preferably 63.435°.

The secondary wire Ls is in a linear shape extending from a second primary end point Pm2 to a secondary end point Ps along a direction perpendicular to the primary wire Lm. The length of the secondary wire Ls is half the length of the primary wire Lm. When the length of the secondary wire Ls is a unit length LRP, the length of the primary wire Lm is 2LRP. The unit length LRP, that is the length of the secondary wire Ls, is the same as the length of a side of a lattice unit. The secondary end point Ps corresponds to the first primary end point Pm1 of another reference pattern element 31RP located in the extending direction of the primary wire Lm, with respect to the secondary wire Ls having the secondary end point Ps in question.

Each reference pattern element 31RP further includes two auxiliary wires La. Each of the auxiliary wires La is in a linear shape extending along a direction perpendicular to an extending direction, that is the direction in which the primary wire Lm extends, and has a length equal to that of the secondary wire Ls. In other words, the length of the auxiliary wire La is the unit length LRP. Of the two auxiliary wires La, one extends from the second primary end point Pm2 to a second auxiliary end point Pa2, and the other extends from the secondary end point Ps to a first auxiliary end point Pa1. The width of each of the primary wire Lm, the secondary wire Ls, and the auxiliary wires La is in the range of 0.1 µm or more to 12 µm or less, for example.

Each reference pattern element 31RP is in a shape partially conforming to the lattice pattern whose one side is in the unit length LRP. In other words, each reference pattern element 31RP is in a shape conforming to a two-dimensional lattice pattern in which the primary wire Lm configures a side extending along the extending direction and the secondary wire Ls and the auxiliary wire La configure a side extending along a direction perpendicular to the primary wire Lm. The two-dimensional lattice pattern is in a shape in which squares, i.e. lattice units, are two-dimensionally and contiguously arranged.

In plan view perpendicular to the sensing surface 33S, when the plurality of reference pattern elements 31RP on the drive surface 31S overlaps the plurality of reference pattern elements on the sensing surface 33S, the first primary end point Pm1, the second primary end point Pm2, the secondary end point Ps, the first auxiliary end point Pa1, and the second auxiliary end point Pa2 are located at the lattice points of square lattice. Thus, while the reference pattern elements 31RP of the drive electrode 31DP and the reference pattern elements of the sensing electrode 33SP have mutually intersecting points, i.e. overlapping points, they do not have line segments configuring the same sides of the lattice pattern.

Therefore, in plan view perpendicular to the sensing surface 33S, of the four line segments configuring each of the plurality of lattice units forming the lattice pattern in the drive sections 21D, two are part of the drive electrode wire 41, and two are part of a sensing dummy wire 52. In contrast to this, in plan view perpendicular to the sensing surface 33S, of the four line segments configuring each of the plurality of lattice units forming the lattice pattern in the sensing sections 21S, two are part of a sensing electrode wire 51, and two are part of the drive dummy wire 42.

As a result, in plan view perpendicular to the sensing surface 33S, the drive electrode 31DP and the sensing electrode 33SP are not easily recognized as separate structures.

FIG. 6 is a partially enlarged diagram illustrating a drive capacitive electrode part 31DPa of the drive electrode 31DP. In FIG. 6, the width of the electrode wire is exaggeratedly depicted for the sake of convenience in describing the arrangement of the electrode wires of the drive electrode wire 41.

As shown in FIG. 6, each drive electrode wire 41 of the drive capacitive electrode part 31DPa is configured of a plurality of reference pattern elements 31RP arrayed along the first direction D1, and a plurality of drive electrode wires 41 are arranged along the second direction D2.

In the drive capacitive electrode part 31DPa, the drive electrode wires 41 connected to the respective drive electrode wires 41 configuring the drive connecting part 31DPb are connected to the pad 31P of the drive electrode 31DP. On the other hand, if the drive electrode wires 41 located being distanced from the drive electrode wires 41 configuring the drive connecting part 31DPb include only portions configured of the plurality of reference pattern elements 31RP, these drive electrode wires 41 cannot be electrically connected to the pad 31P of the drive electrode 31DP.

Thus, the drive capacitive electrode part 31DPa includes a drive connecting wire Lcd having a length equal to that of the secondary wire Ls as a part of the drive electrode wire 41. The drive connecting wire Lcd electrically connects two drive electrode wires 41 adjacent to each other in the second direction D2.

The drive connecting wire Lcd extends from the second auxiliary end point Pa2 of a reference pattern element 31RP of a drive electrode wire 41 to the midpoint in the extending direction of the primary wire Lm of a reference pattern element 31RP of the drive electrode wires 41 adjacent in the second direction D2.

In a drive capacitive electrode part 31DPa, eight drive connecting wires Lcd arrayed along the second direction D2 configure a drive connecting wire group. The drive connecting wire group is located in each of the drive capacitive electrode parts 31DPa along the first direction D1.

The drive electrode wires 41 configuring the drive electrodes 31DP and the drive dummy wires 42 may be formed by etching a thin film formed on the drive surface 31S via a mask, or may be formed by physical vapor deposition using a mask, e.g., vacuum vapor deposition or sputtering.

Configuration of the Touch Sensor Electrode

Figure 7:
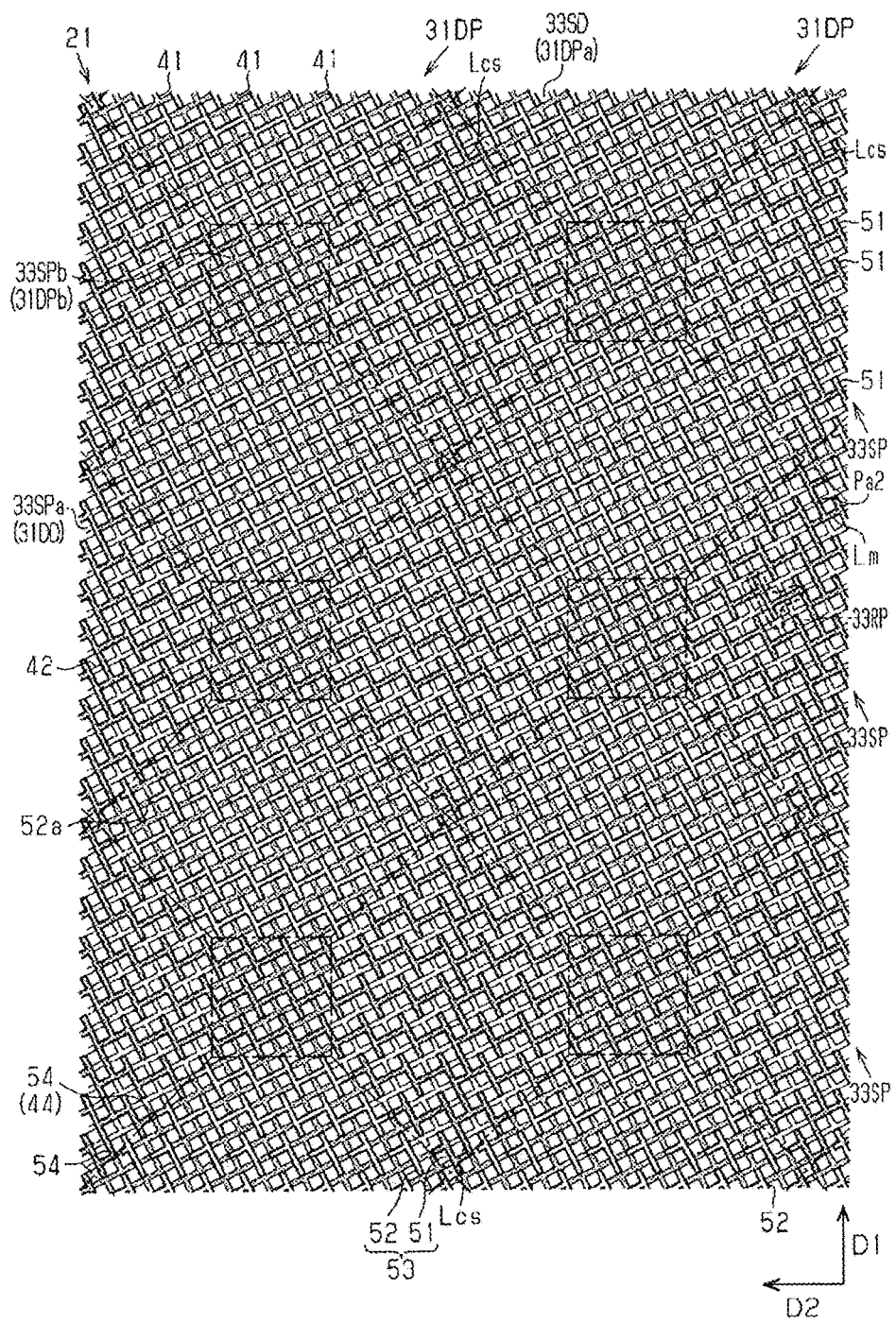
FIG. 7 is a plan view illustrating a relationship between an arrangement of the drive electrode wires and that of sensing electrode wires of the display device of FIG. 1.

Referring to FIG. 7, a configuration of the touch sensor electrode will be described. In FIG. 7, the width of each drive electrode wire and the width of each sensing electrode wire are exaggeratedly depicted for the sake of convenience in describing the arrangement of a plurality of drive electrode wires of the drive electrodes 31DP and the arrangement of a plurality of sensing electrode wires of the sensing electrodes 33SP.

As shown in FIG. 7, a sensing electrode 33SP includes a plurality of sensing capacitive electrode parts 33SPa arrayed along the second direction D2 and the sensing connecting part 33SPb each connecting two sensing capacitive electrode parts 33SPa adjacent to each other. The plurality of sensing electrodes 33SP are arrayed along the first direction D1.

In a sensing electrode 33SP, each of the sensing capacitive electrode parts 33SPa and each of the sensing connecting parts 33SPb are configured of a plurality of sensing electrode wires 51. Each sensing electrode 33SP is a set of a plurality of sensing electrode wires 51. Each sensing electrode wire 51 includes a plurality of reference pattern elements 33RP having a pattern determined with reference to to the first direction D1, as a reference direction, in the sensing electrode 33SP, for example. Although the reference pattern element 33RP of the sensing electrode 33SP has its reference direction different from the reference direction of the reference pattern element 31RP of the drive electrode 31DP, these pattern elements have a common configuration other than the reference direction.

The sensing capacitive electrode part 33SPa has, for example, nine sensing electrode wires 51 arrayed being equally spaced along the first direction D1 and extending along the second direction D2. The sensing connecting part 33SPb includes, for example, three sensing electrode wires 51 arrayed being equally spaced along the first direction D1 and extending along the second direction D2.

Of the nine sensing electrode wires 51 configuring the sensing capacitive electrode part 33SPa, three sensing electrode wires 51 located at the center in the first direction D1 are respectively connected to the three sensing electrode wires 51 configuring the sensing connecting part 33SPb. Thus, in a sensing electrode 33SP, three sensing electrode wires 51 are located continuously extending along the second direction D2 at the center in the first direction D1.

On the other hand, of the sensing electrode wires 51 configuring the sensing capacitive electrode part 33SPa, six that are different from the three located at the center in the first direction D1 have the following configuration.

In the six sensing electrode wires 51, the length along the second direction D2 becomes smaller as the distance from the center of the sensing capacitive electrode part 33Spa becomes larger in the first direction D1. In each of the six sensing electrode wires 51, the length along the second direction D2 is shorter than the length of the sensing electrode wire 51 located at the center by the same length at both ends in the second direction D2. Thus, the outer shape of the sensing capacitive electrode part 33SPa defined by the end portions of the sensing electrode wires 51 is hexagonal.

In contrast to this, in the three sensing electrode wires 51 configuring the sensing connecting part 33SPb, the length along the second direction D2 is substantially equal to the total width of the three sensing electrode wires 51 along the first direction D1. Thus, in the sensing connecting part 33SPb, the outer shape of the sensing connecting part 33SPb defined by the end portions of the sensing electrode wires 51 is rectangle.

In the sensing capacitive electrode part 33SPa, the sensing electrode wires 51 connected to the sensing electrode wires 51 configuring the sensing connecting part 33SPb are connected to the pad 33P of the sensing electrode 33SP. On the other hand, in the case where the sensing electrode wires 51 located being distanced from the sensing electrode wires 51 configuring the sensing connecting part 33SPb include only a portion configured of the plurality of reference pattern elements 33RP, the sensing electrode wires 51 cannot be electrically connected to the pad 33P of the sensing electrode 33SP.

Thus, the sensing capacitive electrode part 33SPa includes a sensing connecting wire Lcs having a length equal to that of the secondary wire Ls. The sensing connecting wire Lcs electrically connects two sensing electrode wires 51 adjacent to each other in the first direction D1.

The sensing connecting wire Lcs extends from the second auxiliary end point Pa2 of a reference pattern element 33RP of a sensing electrode wire 51 to the midpoint in the extending direction of the primary wire Lm of a reference pattern element 33RP of the sensing electrode wires 51 adjacent in the first direction D1. In plan view perpendicular to the sensing surface 33S, the sensing connecting wires Lcs overlap the intra-dummy gaps 42a different from each other located on the drive surface 31S.

In one sensing capacitive electrode part 33SPa, eight sensing connecting wires Lcs arrayed along the first direction D1 configure a sensing connecting wire group. The sensing connecting wire group is located in each of the sensing capacitive electrode parts 33SPa along the second direction D2.

The sensing dummy parts 33SD are located between two sensing electrodes 33SP adjacent to each other in the first direction D1. The sensing dummy parts 33SD are each located between two sensing capacitive electrode parts 33SPa of one sensing electrode 33SP and two sensing capacitive electrode parts 33SPa of the other sensing electrode 33SP.

The sensing dummy part 33SD includes six sensing dummy wires 52, for example, equally spaced along the first direction D1, with each of the sensing dummy wires 52 extending along the second direction D2. Each sensing dummy wire 52 includes a plurality of reference pattern elements 33RP in a pattern determined with reference to the first direction D1.

In the six sensing dummy wires 52, the width along the second direction D2 is largest at two sensing dummy wires 52 located at the center in the first direction D1, and becomes smaller towards both ends in the first direction D1. Two sensing dummy wires 52 sandwiching the two sensing dummy wires 52 at the center in the first direction D1 and equally distanced from the center in the first direction D1 have an equal length along the second direction D2. In four sensing dummy wires 52 different from the two sensing dummy wires 52 located at the center in the first direction D1, the length along the second direction D2 is shorter than the sensing dummy wires 52 located at the center by the same length at both ends in the second direction D2.

Thus, the outer shape of the sensing dummy part 33SD defined by the end portions of the sensing dummy wires 52 is hexagonal.

Of the sensing dummy wires 52 included in one sensing dummy part 33SD, one of the sensing dummy wires 52 located at the center in the first direction D1 has a plurality of intra-dummy gaps 52a which are equally spaced along the second direction D2. The plurality of intra-dummy gaps 52a is located in each of the sensing dummy parts 33SD along the first direction D1 and the second direction D2. In plan view perpendicular to the sensing surface 33S, the intra-dummy gaps 52a on the sensing surface 33S overlap the mutually different drive connecting wires Lcd.

In the second direction D2, the sensing dummy parts 33SD and part of the sensing capacitive electrode parts 33SPa are alternately and contiguously arrayed. In part of the touch sensor electrode 21, in the second direction D2, the sensing dummy wires 52 configuring the sensing dummy part 33SD and the sensing electrode wires 51 configuring the sensing capacitive electrode part 33SPa are alternately and contiguously arrayed. The sensing electrode wires 51 and the sensing dummy wires 52, which are alternately and contiguously arrayed in the second direction D2, configure a sensing pattern group 53. The sensing electrode wire 51 and the sensing dummy wire 52 adjacent to each other in the second direction D2 include part of a common reference pattern element 33RP.

In the sensing pattern group 53, a sensing gap 54 is provided between an end portion of a sensing electrode wire 51 and an end portion of a sensing dummy wire 52 in the second direction D2. The sensing gap 54 separates the sensing electrode wire 51 from the sensing dummy wire 52. Thus, the sensing dummy part 33SD is separated from the sensing electrode 33SP. In other words, the sensing dummy part 33SD is electrically insulated from the sensing electrode 33SP.

In plan view perpendicular to the sensing surface 33S, part of the sensing gaps 54 three-dimensionally overlap the drive gaps 44.

The material forming the sensing electrode wire 51 and the sensing dummy wire 52 is copper, for example, among the metals mentioned above. In plan view perpendicular to the sensing surface 33S, the sensing electrode wires 51 and the sensing dummy wires 52 have the same hue, black, for example.

The sensing electrode wires 51 and the sensing dummy wires 52 are blackened through black oxide treatment of a metal thin film for forming the sensing electrode wire 51 and the sensing dummy wire 52. Alternatively, the sensing electrode wires 51 and the sensing dummy wires 52 are black-oxide treated so as to be blackened. Examples of the black oxide treatment include oxidation, plating for providing a black metal film, or the like.

Typically, the black oxide treatment of the sensing electrode wires 51 and the sensing dummy wires 52 is performed at a time point different from the black oxide treatment of the drive electrode wires 41 and the drive dummy wires 42. Therefore, at least one of brightness and saturation in the black color of the sensing electrode wires 51 and the sensing dummy wires 52 is often different from at least one of brightness and saturation of the black color of the drive electrode wires 41 and the drive dummy wires 42.

When the touch sensor electrode 21 is visually recognized, the drive electrode wires 41 and the drive dummy wires 42 are visually recognized via the transparent dielectric substrate 33. Therefore, the color of the drive electrodes 31DP is often visually recognized as being different from the color of the sensing electrodes 33SP.

In the touch sensor electrode 21, each drive capacitive electrode part 31DPa three-dimensionally overlaps a sensing dummy part 33SD located between two sensing electrodes 33SP adjacent to each other, in plan view perpendicular to the sensing surface 33S. In other words, in plan view perpendicular to the sensing surface 33S, the drive capacitive electrodes parts 31DPa and the sensing dummy parts 33SD are three-dimensionally arranged such that the drive capacitive electrode parts 31DPa overlap the respective sensing dummy parts 33SD.

Thus, in plan view perpendicular to the sensing surface 33S, the drive electrode wires 41 configuring the drive capacitive electrode parts 31DPa co-operate with the sensing dummy wires 52 configuring the sensing dummy parts 33SD to form a square lattice configured of the reference pattern elements 31RP and 33RP. In other words, the drive electrode wires 41 configuring the drive capacitive electrode parts 31DPa and the sensing dummy wires 52 configuring the sensing dummy parts 33SD configure mutually intersecting separate line segments in the drive sections 21D of a common lattice pattern.

On the other hand, in the touch sensor electrode 21, each sensing capacitive electrode part 33SPa three-dimensionally overlaps a drive dummy part 31DD located between two drive electrodes 31DP adjacent to each other, in plan view perpendicular to the sensing surface 33S. In other words, in plan view perpendicular to the sensing surface 33S, the sensing capacitive electrode parts 33SPa and the drive dummy parts 31DD are three-dimensionally arranged such that the sensing capacitive electrode parts 33SPa overlap the respective drive dummy parts 31DD.

Thus, in plan view perpendicular to the sensing surface 33S, the sensing electrode wires 51 configuring the sensing capacitive electrode parts 33SPa co-operate with the drive dummy wires 42 configuring the drive dummy parts 31DD to form a square lattice configured of the reference pattern elements 31RP and 33RP. In other words, the sensing electrode wires 51 configuring the sensing capacitive electrode parts 33SPa and the drive dummy wires 42 configuring the drive dummy parts 31DD configure mutually intersecting separate line segments in the sensing sections 21S of the foregoing lattice pattern.

In plan view perpendicular to the sensing surface 33S, the drive connecting parts 31DPb three-dimensionally overlap the respective sensing connecting parts 33SPb. In other words, in plan view perpendicular to the sensing surface 33S, the drive connecting parts 31DPb and the sensing connecting parts 33SPb are three-dimensionally arranged such that the drive connecting parts 31DPb overlap the respective sensing connecting parts 33SPb. Thus, in plan view perpendicular to the sensing surface 33S, the drive electrode wires 41 configuring the drive connecting parts 31DPb co-operate with the sensing electrode wires 51 configuring the sensing connecting parts 33SPb to form a square lattice configured of the reference pattern elements 31RP and 33RP. In other words, the drive electrode wires 41 configuring the drive connecting parts 31DPb and the sensing electrode wires 51 configuring the sensing connecting parts 33SPb configure mutually intersecting separate line segments in sections different from the drive sections 21D and the sensing sections 21S in the foregoing lattice pattern.

Advantageous Effects of the Touch Sensor Electrode

Figure 8:
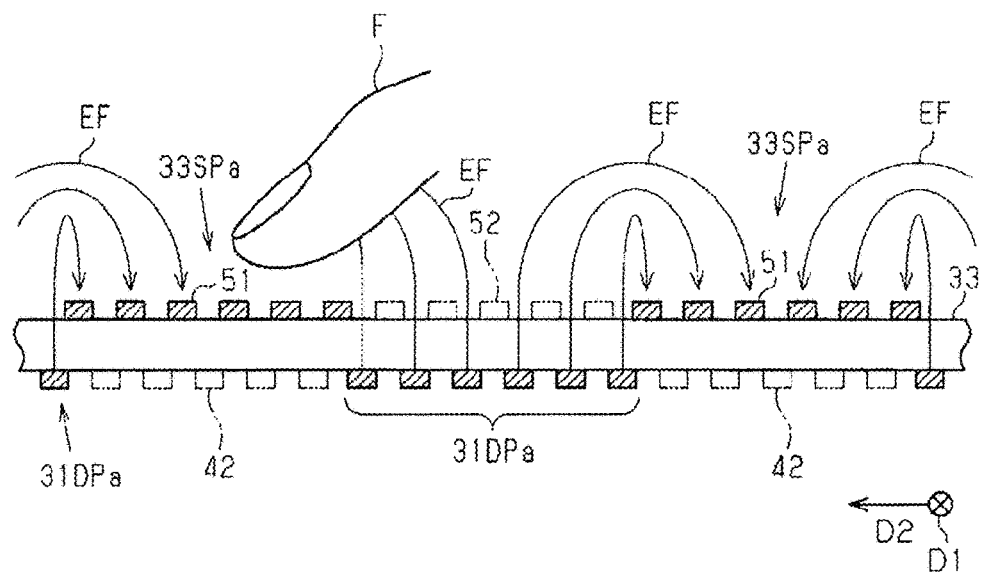
FIG. 8 is a diagram illustrating manipulation of the display device of FIG. 1.
Figure 9:
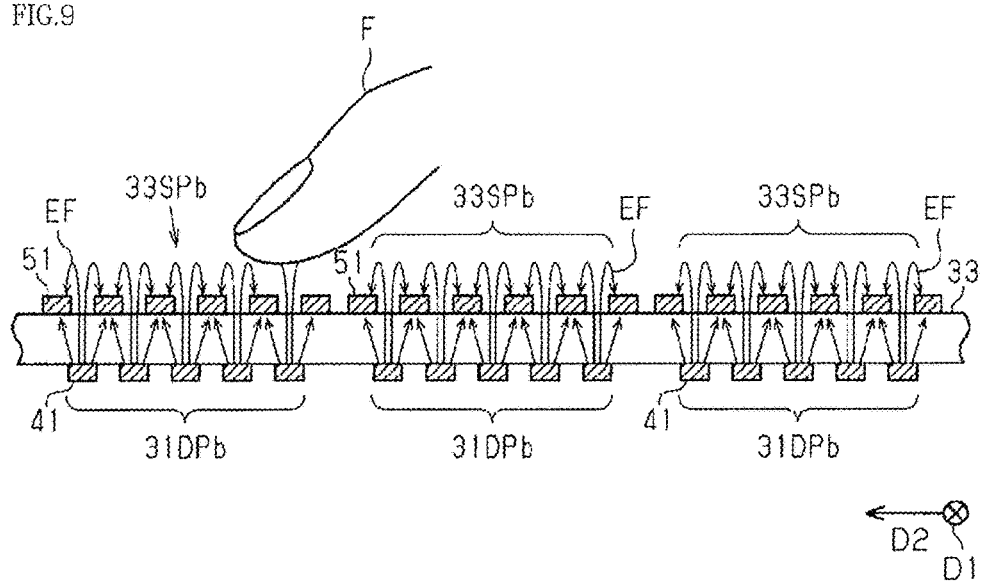
FIG. 9 is a diagram illustrating manipulation of the display device of FIG. 1.

Referring to FIGS. 8 and 9, advantageous effects of the touch sensor electrode will be described. In FIGS. 8 and 9, the transparent substrate 31 where the drive electrodes 31DP are located is omitted, for the sake of convenience in description. In FIG. 8, the drive dummy wires 42 and the sensing dummy wires 52 are each depicted by a broken line, for the sake of convenience in description.

As shown in FIG. 8, the selection circuit 34 outputs a drive signal to the drive electrode 31DP. For example, in plan view perpendicular to the sensing surface 33S, electric fields EF are formed between the drive capacitive electrode part 31DPa and the sensing capacitive electrode part 33SPa adjacent to each other in the second direction D2. In the drive capacitive electrode part 31DPa and the sensing capacitive electrode part 33SPa, the electric field EF is formed between one of the drive electrode wires 41 configuring the drive capacitive electrode part 31DPa and one of the sensing electrode wires 51 configuring the sensing capacitive electrode part 33SPa.

The drive capacitive electrode part 31DPa does not overlap the sensing capacitive electrode part 33SPa in plan view perpendicular to the sensing surface 33S. Thus, these capacitive electrode parts 31DPa and 33SPa are likely to be electrically affected from outside the transparent dielectric substrate 33. Therefore, the electric field EF between the drive capacitive electrode part 31DPa and the sensing capacitive electrode part 33SPa is formed at a portion that is easily electrically affected from outside the transparent dielectric substrate 33.

When a human finger F comes close to the touch sensor electrode 21 thus formed, the electric field EF that has touched the finger F is released through the human body. Accordingly, the magnitude of the electrostatic capacitance formed across the drive electrode 31DP and the sensing electrode 33SP changes. As described above, the electric field EF, when extending from an electrode wire of the drive capacitive electrode part 31DPa to an electrode wire of the sensing capacitive electrode part 33Spa, is located at a portion of being easily electrically affected from outside. Thus, the electric field EF is easily affected by the human finger F. Therefore, in the touch sensor electrode 21, the sensitivity to a touch of the human finger F is enhanced between the drive capacitive electrode parts 31DPa and the sensing capacitive electrode parts 33SPa. As a result, the sensitivity of detecting the position of a touch of the human finger F is enhanced.

On the other hand, as shown in FIG. 9, electrostatic capacitance is formed at portions where the drive electrode wires 41 forming the drive connecting part 31DPb three-dimensionally intersect the sensing electrode wires 51 forming the sensing connecting part 33SPb in plan view perpendicular to the sensing surface 33S. Thus, while the selection circuit 34 outputs drive signals to the drive electrodes 31DP, a substantially linear electric field EF extends from a drive electrode wire 41 of a drive connecting part 31DPb towards a sensing electrode wire 51 of a sensing connecting part 33SPb. Thus, the electric fields EF are located at portions where they are unlikely to be electrically affected from outside the transparent dielectric substrate 33.

Therefore, in the touch sensor electrode 21, if the human finger F comes close to the portion where a drive connecting part 31DPb three-dimensionally overlaps a sensing connecting part 33SPb, the state of the electric field EF before being approached by the finger F does not greatly change from the state after being approached by the finger F. As a result, the touch panel 20 will have a high resistance to noise inputted to the touch sensor electrode 21 at portions where the drive connecting parts 31DPb overlap the sensing connecting parts 33SPb.

In the touch sensor electrode 21, the combination of the drive electrode wires 41 and the sensing dummy wires 52 forms a lattice pattern, and the combination of the sensing electrode wires 51 and the drive dummy wires 42 forms a lattice pattern, in plan view perpendicular to the sensing surface 33S. Thus, the black color of the drive electrodes 31DP and the black color of the sensing electrodes 33SP are not easily individually recognized. Therefore, if at least one of brightness and saturation is different between the black color of the drive electrodes 31DP and the black color of the sensing electrodes 33SP, the difference therebetween is not easily noticeable. As a result, the boundary between the drive electrode 31DP and the sensing electrode 33SP is unlikely to be visually recognized, and the drive electrode 31DP and the sensing electrode 33SP are unlikely to be visually recognized.

As described above, advantages enumerated below can be obtained according to the first embodiment.

(1) In plan view perpendicular to the sensing surface 33S, the combination of the drive electrode wires 41 and the sensing dummy wires 52 forms a lattice pattern, and the combination of the sensing electrode wires 51 and the drive dummy wires 42 forms a lattice pattern. Thus, the color of the drive electrode 31DP and the color of the sensing electrode 33SP are unlikely to be individually recognized. Therefore, if the color of the drive electrode 31DP is different from that of the sensing electrode 33SP, the difference between the colors is not easily noticeable. As a result, the boundary between the drive electrode 31DP and the sensing electrode 33SP is unlikely to be visually recognized, and the drive electrode 31DP and the sensing electrode 33SP are unlikely to be visually recognized.

(2) In the drive electrode 31DP and the sensing electrode 33SP, the electrostatic capacitance is formed across a drive capacitive electrode part 31DPa and a sensing capacitive electrode part 33SPa, which do not overlap each other in plan view perpendicular to the sensing surface 33S. The capacitance portion across the drive capacitive electrode part 31DPa and the sensing capacitive electrode part 33SPa is likely to be electrically affected from outside the transparent dielectric substrate 33. Thus, when an electric conductor comes close to the touch sensor electrode 21, the electrostatic capacitance across the drive capacitive electrode part 31DPa and the sensing capacitive electrode part 33SPa varies. Accordingly, the accuracy of detecting the position of the electric conductor relative to the touch sensor electrode 21 is enhanced.

(3) In each drive section 21D of the lattice pattern, the lattice units are configured of part of the drive electrode wires 41 and part of the sensing dummy wires 52, and in each sensing section 21S, the lattice units are configured of part of the sensing electrode wires 51 and part of the drive dummy wires 42. Accordingly, in plan view perpendicular to the sensing surface 33S, the drive electrodes 31DP located on the drive surface 31S and the sensing electrodes 33SP located on the sensing surface 33S are more unlikely to be recognized as separate structures.

(4) Each drive electrode wire 41 and each sensing electrode wire 51 include a plurality of reference pattern elements 31RP and 33RP, respectively. Accordingly, the drive electrodes 31DP and the sensing electrodes 33SP are easily designed.

(5) Since the primary wire angle θ is greater than 0° and smaller than 180°, each of a plurality of line segments configuring the lattice pattern can be tilted relative to the first direction D1 and the second direction D2.

(6) If at least one of brightness and saturation is different between the drive electrode wires 41 and the sensing dummy wires 52, and, if at least one of brightness and saturation is different between the sensing electrode wires 51 and the drive dummy wires 42, the difference in color between the drive electrodes 31DP and the sensing electrodes 33SP is not easily noticeable.

Modifications of the First Embodiment

The foregoing first embodiment can be appropriately modified and implemented as follows.

The drive electrode wires 41, the drive dummy wires 42, the sensing electrode wires 51, and the sensing dummy wires 52 are not necessarily needed to be black. For example, the drive electrode wires 41, the drive dummy wires 42, the sensing electrode wires 51, and the sensing dummy wires 52 may be configured to have a metallic luster or light transmission properties. In this case, materials used for forming an electrode wire having light transmission properties include metal oxide films such as of zinc oxide, and complex oxide films such as of indium tin oxide or indium gallium zinc oxide. The complex oxide films include whose which are made of a metal oxide such as of indium, tin, gallium or zinc. Materials that can be used for the electrode wire having a metallic luster include a silver nanowire and a conductive polymer film, in addition to the metal films mentioned above. Materials that can be used for the black electrode wire include an electrically conductive film, such as a graphene film, not being limited to the black-oxide treated metal wire.

With such a configuration as well, the color of the drive electrodes 31DP is different from that of the sensing electrodes 33SP more than a little as viewed from the front surface of the transparent dielectric substrate 33, due to the location of the transparent dielectric substrate 33 between the drive electrodes 31DP and the sensing electrodes 33SP. Therefore, significant advantages equivalent to those stated in (1) can be obtained.

In plan view perpendicular to the sensing surface 33S, the drive electrodes 31DP and the drive dummy parts 31DD may be configured to have the same color attributes, and the sensing electrodes 33SP and the sensing dummy parts 33SD may be configured to have color attributes different from those of the drive electrodes 31DP. Color attributes include three characteristics of hue, brightness and saturation. Therefore, while all of the three color characteristics of the drive electrodes 31DP are the same as those of the drive dummy parts 31DD, at least one of the three color characteristics of the sensing electrodes 33SP and the sensing dummy parts 33SD is different from that of the drive electrodes 31DP. With this configuration as well, advantages equivalent to those stated in (1) can obtained.

The drive electrodes 31DP, the drive dummy parts 31DD, the sensing electrodes 33SP, and the sensing dummy parts 33SD may have the same color attributes. With this configuration as well, the transparent dielectric substrate 33 is interposed between the drive electrodes 31DP and the drive dummy parts 31DD, and the sensing electrodes 33SP and the sensing dummy parts 33SD. Thus, in plan view perpendicular to the sensing surface 33S, the color of the drive electrodes 31DP and the drive dummy parts 31DD can be different from that of the sensing electrodes 33SP and the sensing dummy parts 33SD more than a little. Accordingly, advantages equivalent to those stated in (1) can be obtained.

The primary wire angle θ may be 0°. In other words, the four sides of one lattice unit configuring the lattice pattern may have two sides linearly extending along the first direction D1 and two sides linearly extending along the second direction D2. With this configuration as well, advantages equivalent to those stated in (4) can be obtained, as long as the lattice pattern is formed of a plurality of reference pattern elements 31RP.

The reference pattern element 31RP may be configured as described below referring to FIGS. 10 and 11, instead of one described above.

Figure 10:
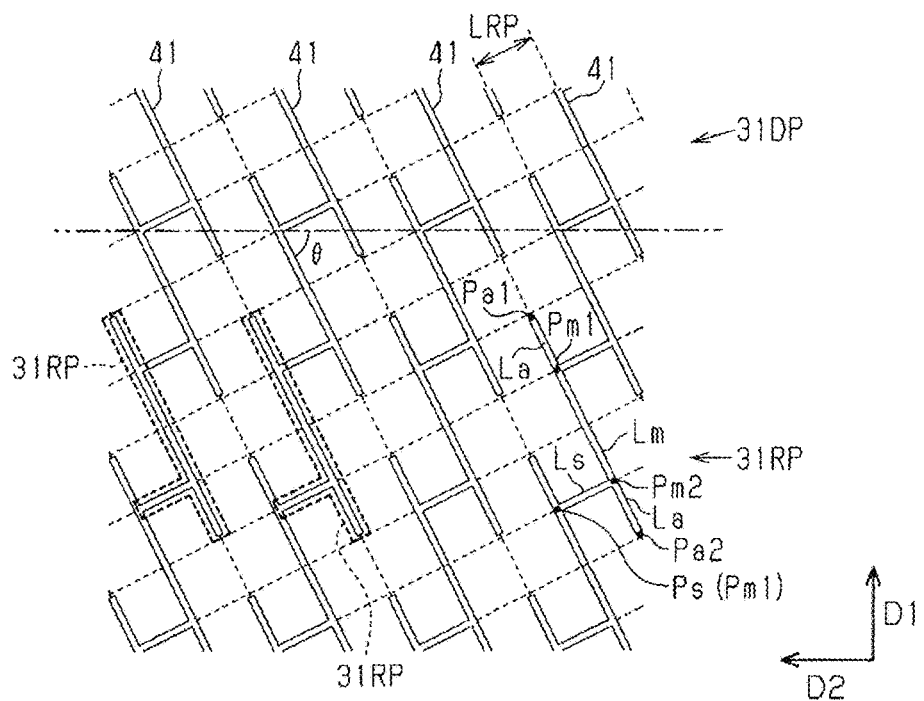
FIG. 10 is a partially enlarged view illustrating part of a drive electrode according to a modification of the first embodiment.
Figure 11:
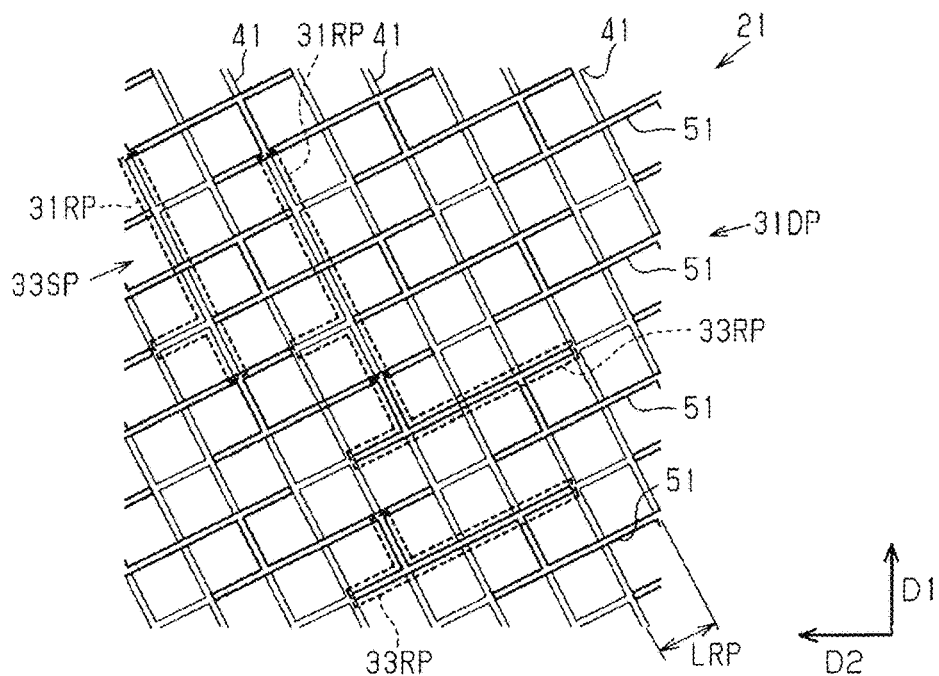
FIG. 11 is a plan view illustrating a relationship between an arrangement of drive electrode wires and that of sensing electrode wires according to the modification of FIG. 10.

In FIGS. 10 and 11, the width of each drive electrode wire and the width of each sensing electrode wire are exaggeratedly depicted, for the sake of convenience in describing the arrangement of a plurality of drive electrode wires configuring the drive electrodes 31DP and a plurality of sensing electrode wires configuring the sensing electrodes 33SP. Although the positions of the drive dummy wires 42 on the drive surface 31S are different from those of the drive electrode wires 41, each of the reference pattern elements 31RP configuring the drive dummy wires 42 is similar to the one used for the drive electrode wires 41. Therefore, details of the drive dummy wire 42 are omitted. Also, although the positions of the sensing dummy wires 52 on the sensing surface 33S are different from those of the sensing electrode wires 51, each of the reference pattern elements 33RP configuring the sensing dummy wire 52 is similar to the one used for the sensing electrode wires 51. Therefore, details of the sensing dummy wire 52 are omitted.

As shown in FIG. 10, each drive electrode 31DP is a set of a plurality of drive electrode wires 41. The drive electrode wires 41 are equally spaced along the second direction D2, while extending along the first direction D1. Each of the drive electrode wires 41 is configured of a plurality of reference pattern elements 31RP. In each drive electrode wire 41, a plurality of reference pattern elements 31RP are arranged along the first direction D1.

Each reference pattern element 31RP includes a primary wire Lm and a secondary wire Ls. The primary wire Lm has a linear shape and forms a primary wire angle θ that is a predetermined angle relative to the second direction D2 that is a reference direction of the drive electrode 31DP. The primary wire Lm extends from a first primary end point Pm1 to a second primary end point Pm2. The primary wire angle θ is a predetermined angle in an angle range of greater than 0° and smaller than 180°, preferably in a range of 45° or more to 135° or less, and more preferably 63.435°. The primary wire angle θ may be 0°. The primary wire angle θ formed relative to the second direction D2 defines an extending direction.

The secondary wire Ls has a linear shape and extends from the second primary end point Pm2 to a secondary end point Ps along the direction perpendicular to the primary wire Lm. The length of the secondary wire Ls is half the length of the primary wire Lm. When the length of the secondary wire Ls is a unit length LRP, the length of the primary wire Lm is 2LRP. The secondary end point Ps is the first primary end point Pm1 of another reference pattern element 31RP located in the extending direction of the secondary wire Ls with respect to the secondary wire Ls having the secondary end point Ps.

Each reference pattern element 31RP further includes two auxiliary wires La. Each auxiliary wire La has a linear shape, extends along the extending direction, that is the direction in which the primary wire Lm extends, and has the unit length LRP equal to that of the secondary wire Ls. Of the two auxiliary wires La, one extends from the first primary end point Pm1 to the first auxiliary end point Pa1, and the other extends from the second primary end point Pm2 to the second auxiliary end point Pa2.

Each reference pattern element 31RP is in a shape conforming to part of the lattice pattern having a length equal to that of the secondary wire Ls having the unit length LRP. Specifically, each reference pattern element 31RP is in a shape conforming to a two-dimensional lattice pattern in which the primary wire Lm and the auxiliary wire La configure a side extending along the extending direction and the secondary wire Ls configures a side extending along the direction perpendicular to the primary wire Lm. The two-dimensional lattice pattern is in a shape in which squares, i.e. lattice units, are two-dimensionally continue.

When a plurality of drive electrodes 31DP three-dimensionally overlap a plurality of sensing electrodes 33SP with the transparent dielectric substrate 33 being sandwiched therebetween, the first primary end points Pm1, the second primary end points Pm2, the secondary end points Ps, the first auxiliary end points Pa1, and the second auxiliary end points Pa2 are located at lattice points of the lattice pattern. Thus, the reference pattern elements 31RP of the drive electrodes 31DP and the reference pattern elements 33RP of the sensing electrodes 33SP have mutually intersecting points, but do not have any line segment configuring a common side of a lattice square.

As shown in FIG. 11, each sensing electrode 33SP is a set of a plurality of sensing electrode wires 51. The sensing electrode wires 51 are equally spaced along the first direction D1, each extending along the second direction D2. Each of the sensing electrode wires 51 is configured of the reference pattern elements 33RP whose reference direction is the first direction D1. In each sensing electrode wire 51, the plurality of reference pattern elements 33RP are arrayed along the second direction D2.

In the touch sensor electrode 21, the drive connecting parts 31DPb of the drive electrodes 31DP three-dimensionally overlap the sensing connecting parts 33SPb of the sensing electrodes 33SP, in plan view perpendicular to the sensing surface 33S. The drive connecting parts 31DPb of the drive electrodes 31DP co-operate with the sensing connecting parts 33SPb of the sensing electrodes 33SP to form a lattice pattern of two-dimensionally continuing squares with one side being in a length of LPR in plan view perpendicular to the sensing surface 33S.

In the touch sensor electrode 21, the drive capacitive electrode parts 31DPa three-dimensionally overlap the sensing dummy parts 33SD, forming part of the lattice pattern, in plan view perpendicular to the sensing surface 33S. Also, the sensing capacitive electrode parts 33SPa three-dimensionally overlap the drive dummy parts 31DD, forming part of the lattice pattern.

The configuration of the auxiliary wire La of the reference pattern element 31RP of each drive surface 31S may be different from that of the auxiliary wire La of the reference pattern element 33RP of each sensing surface 33S. In other words, each of the reference pattern element 31RP on the drive surface 31S and each of the reference pattern element 33RP on the sensing surface 33S only have to include the primary wire Lm and the secondary wire Ls. In this case, the number of the auxiliary wires La included in each of the reference pattern elements 31RP on the drive surface 31S may be different from that of the auxiliary wires La included in each of the reference pattern elements 33RP on the sensing surface 33S. The position of the auxiliary wire La relative to each of the reference pattern elements 31RP on the drive surface 31S may be different from the position of the auxiliary wire La relative to each of the reference pattern elements 33RP on the sensing surface 33S. In short, the drive electrode wires and the sensing electrode wires only need to have a complementary relationship for forming the lattice pattern in plan view perpendicular to the sensing surface 33S.

Figure 12:
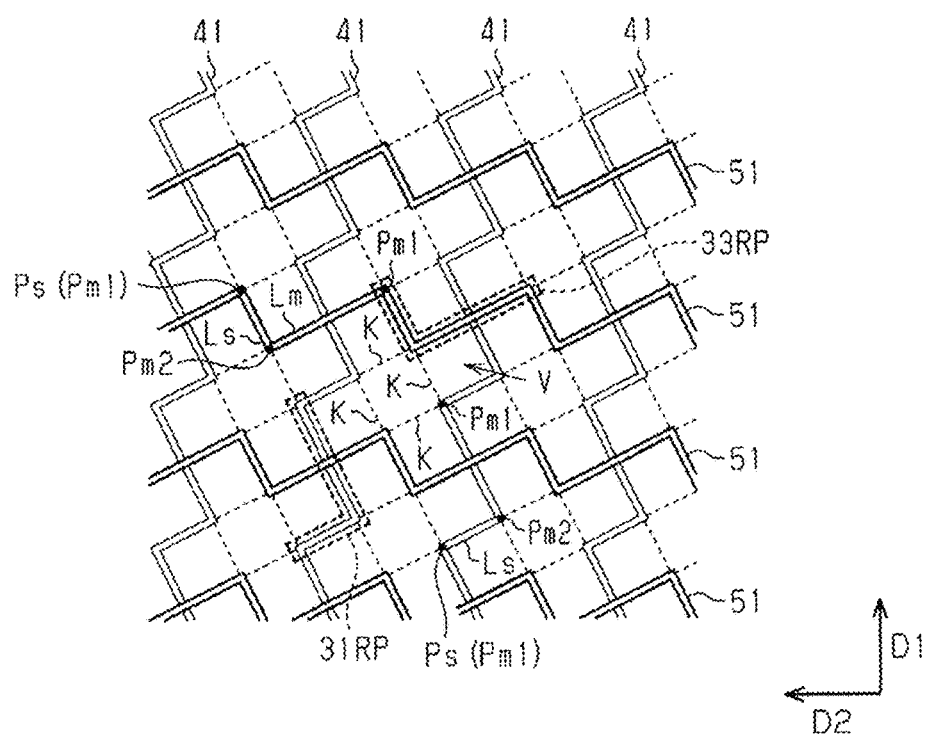
FIG. 12 is a plan view illustrating a relationship between an arrangement of the drive electrode wires and that of the sensing electrode wires according to the modification of FIG. 10.

Specifically, as shown in FIG. 12, the reference pattern element 31RP and the reference pattern element 33RP are configured of a primary wire Lm and a secondary wire Ls. In this case, there is formed an electrode wire gap V which is a region surrounded by two drive electrode wires 41 adjacent to each other in the second direction D2 and two sensing electrode wires 51 adjacent to each other in the first direction D1, in plan view perpendicular to the sensing surface 33S. The electrode wire gap V is in a cross shape configured of five lattice units. In the cross-shaped electrode wire gap V, one lattice unit located at the center is surrounded by other lattice units provided along both sides in the first direction D1 and both sides in the second direction D2.

The lattice unit at the center of the electrode wire gap V has lattice points respectively located with the first primary end point Pm1 of one drive electrode wire 41, the second primary end point Pm2 of the other drive electrode wire 41, the first primary end point Pm1 of one sensing electrode wire 51, and the second primary end point Pm2. On the lattice unit surrounded by the four primary end points, four auxiliary wire regions K are set as regions where at least one of the auxiliary wires included in the drive electrode wire 41 and the sensing electrode wire 51 can be located.

In the auxiliary wire regions K, the auxiliary wires La of the reference pattern elements 31RP on the drive surface 31S and the auxiliary wires La of the reference pattern elements 33RP on the sensing surface 33S are only needed to be determined so as to extend from at least one of the four primary end points to define the four auxiliary wire regions K.

The configuration set to each of the four auxiliary wire regions K may be the same or may be different between the electrode wire gaps V. In the configuration in which the configuration of the auxiliary wire set to each of the four auxiliary wire regions K is different between the electrode wire gaps V, the configurations of the auxiliary wires are not repeated for every electrode wire gap V. Therefore, such auxiliary wires are not included in the reference pattern elements 31RP and 33RP.

The drive electrode wires 41, the drive dummy wires 42, the sensing electrode wires 51, and the sensing dummy wires 52 do not necessarily have to be configured of the reference pattern elements 31RP and 33RP. In short, as long as the lattice pattern is ensured to be formed in plan view perpendicular to the sensing surface 33S, the drive electrode wires 41 and the drive dummy wires 42 may each be configured of a straight wire extending along the first direction D1 or may be configured of a straight wire intersecting the first direction D1 at a predetermined angle. The sensing electrode wires 51 and the sensing dummy wires 52 may each be configured of a straight wire extending along the second direction D2, or may be configured of a straight wire intersecting the second direction D2 at a predetermined angle. Alternatively, the drive electrode wires 41 and the drive dummy wires 42 may each have a polyline shape or a curved line shape extending along the first direction D1. In this case, the sensing electrode wires 51 and the sensing dummy wires 52 may each also have a polyline shape or a curved line shape.

In each drive section 21D of the lattice pattern in plan view perpendicular to the sensing surface 33S, of the four line segments configuring a lattice unit, two are part of a drive electrode wire 41, and two are part of a sensing dummy wire 52. Also, in each sensing section of the lattice pattern in plan view perpendicular to the sensing surface 33S, of the four line segments configuring a lattice unit, two are part of a sensing electrode wire 51, and two are part of a drive dummy wire 42.

Not being limited to this, each drive section 21D may include lattice units, in each of which, of the four line segments, three are part of a drive electrode wire 41 and one is part of a sensing dummy wire 52. Further, each drive section 21D may include lattice units, in each of which one is part of a drive electrode wire 41 and three are part of a sensing dummy wire 52.

Each sensing section 21S may include lattice units, in each of which, of the four line segments, three are part of a sensing electrode wire 51 and one is part of a drive dummy wire 42. Further, each sensing section 21S may include lattice units, in each of which one is part of a sensing electrode wire 51 and three are part of a drive dummy wire 42.

With these configurations as well, advantages equivalent to those in (2) can be obtained as long as each drive section 21D of the lattice pattern includes lattice units each of which includes part of a drive electrode wire 41 and part of a sensing dummy wire 52, and each sensing section 21S includes lattice units each of which includes part of a sensing electrode wire 51 and part of a drive dummy wire 42.

The drive connecting wire Lcd does not necessarily need to be configured to extend from the second auxiliary end point Pa2 of the reference pattern element 31RP of one of two drive electrode wires 41 adjacent to each other towards the center in the extending direction of the primary wire Lm of the other drive electrode wire 41. For example, the drive connecting wire Lcd may be configured to extend along the extending direction from the second auxiliary end point Pa2 of the reference pattern element 31RP of one of two drive electrode wires 41 adjacent to each other towards the first primary end point Pm1 of the other drive electrode wire 41. In short, the drive connecting wire Lcd only has to be a straight wire extending along the extending direction, or the direction perpendicular to the extending direction and have the unit length LRP, and only has to connect two drive electrode wires 41 adjacent to each other in a drive capacitive electrode part 31DPa.

The sensing connecting wire Lcs does not necessarily need to be configured to extend from the second auxiliary end point Pa2 of the reference pattern element 33RP of one of two sensing electrode wires 51 adjacent to each other towards the center in the extending direction of the primary wire Lm of the other sensing electrode wire 51. In short, the sensing connecting wire Lcs only has to be a straight wire extending along the extending direction, or the direction perpendicular to the extending direction and have the unit length LRP, and only has to connect two sensing electrode wires 51 adjacent to each other in a sensing capacitive electrode part 33SPa.

Second Embodiment

Figure 13:
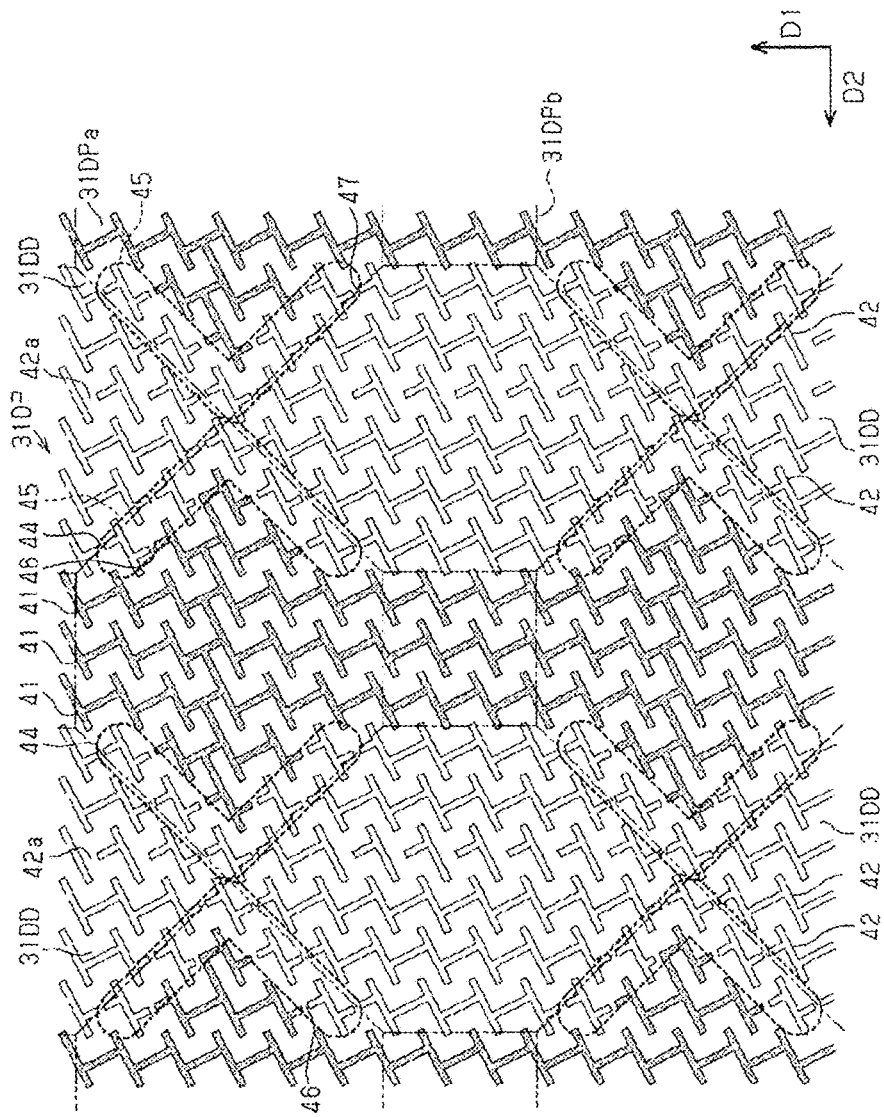
FIG. 13 is a plan view illustrating an arrangement of drive electrode wires according to a second embodiment.
Figure 14:
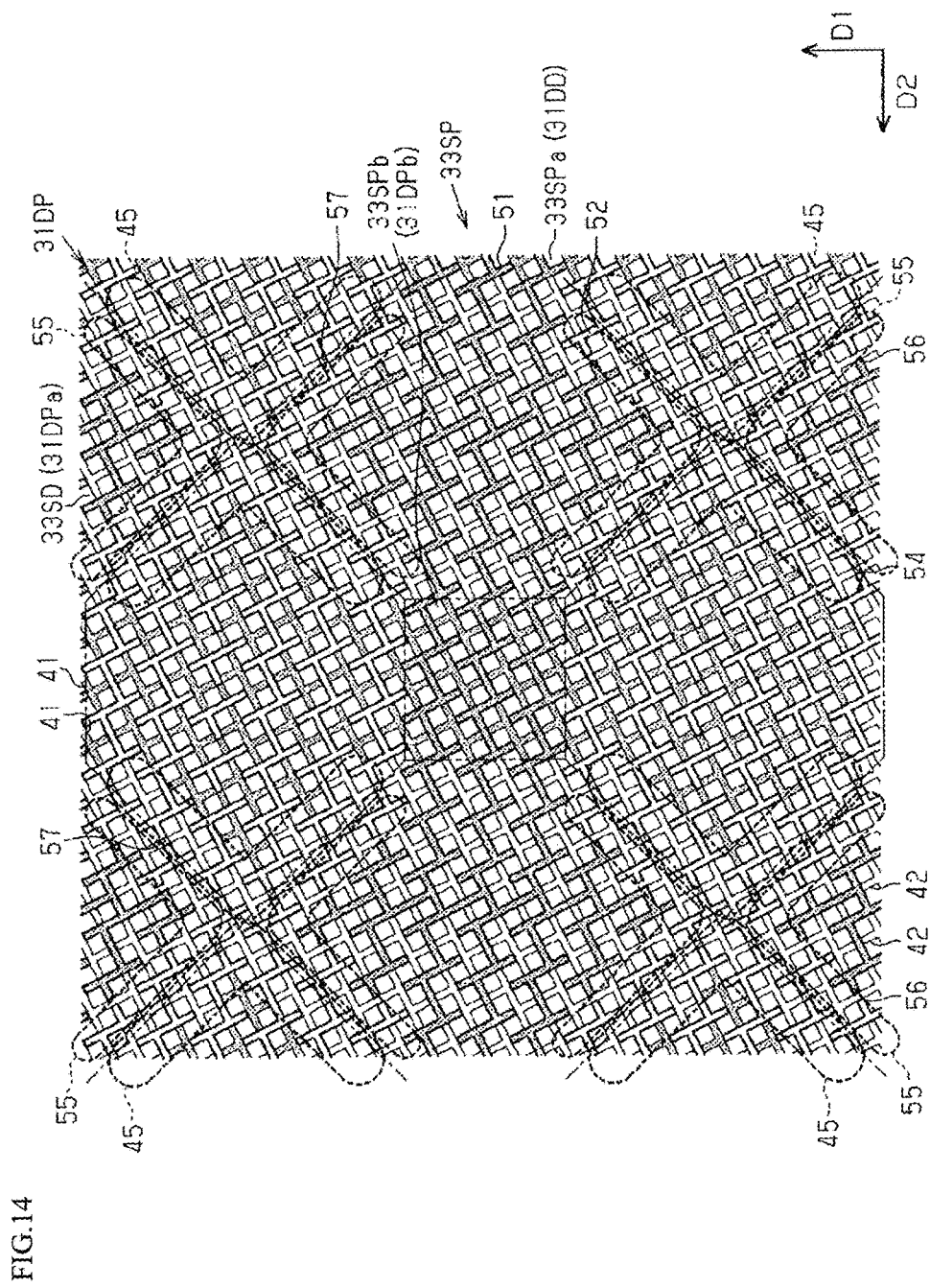
FIG. 14 is a plan view illustrating a relationship between an arrangement of the drive electrode wires and that of sensing electrode wires according to the second embodiment.

Referring to FIGS. 13 and 14, a second embodiment embodying a touch sensor electrode, a touch panel, and a display device will be described. The second embodiment is different from the first embodiment in that an electrode part gap is formed between a drive capacitive electrode part and a sensing capacitive electrode part. Therefore, in the following, differences will be described in detail, and details of the configurations common to those of the first embodiment will be omitted, by designating the same reference signs as those of the first embodiment to the configurations common the first embodiment. In the following, the configurations of a drive electrode and a touch sensor electrode, and advantageous effects of the touch sensor electrode will be described in this order.

Configuration of the Drive Electrode

Referring to FIG. 13, a configuration of a drive electrode will be described. In FIG. 13, the width of each of a plurality of drive electrode wires configuring the drive electrode is exaggeratedly depicted for the sake of convenience in describing the arrangement of the drive electrode wires.

As shown in FIG. 13, a drive electrode 31DP includes a plurality of drive capacitive electrode parts 31DPa arrayed along the first direction D1 and drive connecting parts 31DPb each connecting two drive capacitive electrode parts 31DPa adjacent to each other. A plurality of drive electrodes 31DP are arrayed along the second direction D2.

In the second direction D2, an electrode part gap 45 is located between two drive capacitive electrode parts 31DPa adjacent to each other. The electrode part gaps 45 extend along the outer edges of the drive capacitive electrode parts 31DPa in the second direction D2. In each of the electrode part gaps 45, a plurality of drive dummy wires 42 are located, which are part of drive dummy parts 31DD.

In plan view perpendicular to a sensing surface 33S, a portion except the electrode part gaps 45 in a drive dummy part 31DD faces a sensing capacitive electrode part 33SPa. Thus, each electrode part gap 45 is formed between a drive capacitive electrode part 31DPa and a sensing capacitive electrode part 33SPa in the second direction D2.

The drive dummy wires 42 located in each electrode part gap 45 are distanced from drive electrode wires 41 by an electrode wire gap 46 provided between the drive electrode wires 41 and the drive dummy wires 42, for example. The drive dummy wires 42 located in each electrode part gap 45 are distanced from part of drive dummy wires 42 by a dummy wire gap 47 provided inside the drive dummy part 31DD. The dummy wire gap 47 may be omitted.

Configuration of the Touch Sensor Electrode

Referring to FIG. 14, a configuration of the touch sensor electrode will be described. In FIG. 14, the width of each of a plurality of drive electrode wires configuring each drive electrode and the width of each of a plurality of sensing electrode wires configuring each sensing electrode are exaggeratedly depicted, for the sake of convenience in describing the arrangement of the drive electrode wires and the arrangement of the sensing electrode wires.

As shown in FIG. 14, a sensing electrode 33SP includes a plurality of sensing capacitive electrode parts 33SPa arrayed along the second direction D2, and sensing connecting parts 33SPb each connecting between two sensing capacitive electrode parts 33SPa adjacent to each other. A plurality of sensing electrodes 33SP are arrayed along the first direction D1.

In the first direction D1, an electrode part gap 55 is located between two sensing capacitive electrode parts 33SPa adjacent to each other. The electrode part gaps 55 extend along the outer edges of the sensing capacitive electrode parts 33SPa in the first direction D1. In each of the electrode part gaps 55, a plurality of sensing dummy wires 52 are located, which are part of sensing dummy parts 33SD.

In plan view perpendicular to the sensing surface 33S, in a sensing dummy part 33SD, a portion except the electrode part gaps 55 faces a drive capacitive electrode part 31DPa. Thus, each electrode part gap 55 is formed between a sensing capacitive electrode part 33SPa and a drive capacitive electrode part 31DPa in the first direction D1.

The sensing dummy wires 52 located in each electrode part gap 55 are distanced from sensing electrode wires 51 by an electrode wire gap 56 provided between the sensing electrode wires 51 and the sensing dummy wires 52, for example. The sensing dummy wires 52 located in each electrode part gap 55 are distanced from part of sensing dummy wires 52 by a dummy wire gap 57 provided inside the sensing dummy part 33SD. The dummy wire gap 57 may be omitted.

In the touch sensor electrode 21, each drive capacitive electrode part 31DPa faces a portion of the sensing dummy part 33SD except the electrode part gap 55, and each sensing capacitive electrode part 33SPa faces a portion of the drive dummy part 31DD except the electrode part gap 45, in plan view perpendicular to the sensing surface 33S.

Thus, in plan view perpendicular to the sensing surface 33S, an electrode part gap 45 on the drive surface 31S and an electrode part gap 55 on the sensing surface 33S are formed between a drive capacitive electrode part 31DPa and a sensing capacitive electrode part 33SPa adjacent to each other in the second direction D2. Therefore, in plan view perpendicular to the sensing surface 33S, the drive capacitive electrode parts 31DPa and the sensing capacitive electrode part 33SPa adjacent to each other are distanced from each other by two electrode part gaps 45 and 55 in the first direction D1, and they are distanced from each other by the two electrode part gaps 45 and 55 in the second direction D2.

Advantageous Effects of the Touch Sensor Electrode

In the touch sensor electrode 21, on the drive surface 31S, the electrode part gap 45 is formed between the drive capacitive electrode part 31DPa and the sensing capacitive electrode part 33SPa, and on the sensing surface 33S, the electrode part gap 55 is formed between the drive capacitive electrode part 31DPa and the sensing capacitive electrode part 33SPa.

Thus, electric fields formed between the drive capacitive electrode part 31DPa and the sensing capacitive electrode part 33SPa are easily affected from outside the transparent dielectric substrate 33. Therefore, the accuracy of detecting a finger position relative to the touch sensor electrode 21 is enhanced.

Moreover, part of the drive dummy part 31DD is located in the electrode part gap 45 on the drive surface 31S, and the sensing dummy part 33SD is located in the electrode part gap 55 on the sensing surface 33S. Accordingly, if electrode part gaps are formed in the touch sensor electrode 21, the drive electrodes 31DP and the sensing electrodes 33SP are unlikely to be visually recognized as separate structures.

On the drive surface 31S, the electrode part gap 45 is formed between the drive capacitive electrode part 31DPa and the sensing capacitive electrode part 33SPa, and on the sensing surface 33S, the electrode part gap 55 is formed between the drive capacitive electrode part 31DPa and the sensing capacitive electrode part 33SPa.

Thus, the magnitude of the electrostatic capacitance across the drive capacitive electrode part 31DPa and the sensing capacitive electrode part 33SPa changes, compared with a configuration in which part of the drive capacitive electrode part 31DPa is located in the electrode part gap 45 and part of the sensing capacitive electrode part 33SPa is located in the electrode part gap 55. Accordingly, the electrostatic capacitance across the drive capacitive electrode part 31DPa and the sensing capacitive electrode part 33SPa can be changed in conformity with the specification of a control unit 36 to which the touch sensor electrode 21 is connected.

Moreover, by only positioning the electrode wire gap 46 on the drive surface 31S, and the electrode wire gap 56 on the sensing surface 33S, the electrostatic capacitance across the drive electrode 31DP and the sensing electrode 33SP can be changed. Thus, without forcing a substantial change in design of the drive electrode 31DP or the sensing electrode 33SP provided to the touch sensor electrode 21, the electrostatic capacitance across the drive electrode 31DP and the sensing electrode 33SP can be changed.

As described above, according to the second embodiment, the following advantages can be obtained.

(7) In plan view perpendicular to the sensing surface 33S, the electrode part gap 45 is formed between the drive capacitive electrode part 31DPa and the sensing capacitive electrode part 33SPa. Thus, the accuracy of detecting a finger position relative to the touch sensor electrode 21 is enhanced. Further, part of the drive dummy part 31DD is located in a plurality of electrode part gaps 45. Accordingly, if such electrode part gaps 45 are formed, the drive electrode 31DP and the sensing electrode 33SP are unlikely to be visually recognized as separate structures.

(8) In plan view perpendicular to the sensing surface 33S, the electrode part gap 55 is formed between the drive capacitive electrode part 31DPa and the sensing capacitive electrode part 33SPa. Thus, the accuracy of detecting a finger position relative to the touch sensor electrode 21 is enhanced. Further, part of the sensing dummy part 33SD is located in a plurality of electrode part gaps 55. Thus, with a configuration formed with such electrode part gaps 55, the drive electrode 31DP and the sensing electrode 33SP are unlikely to be visually recognized as separate structures.

Modifications of the Second Embodiment

The second embodiment described above can be appropriately modified and implemented as follows.

On the drive surface 31S, part of the drive dummy part 31DD has been located in all the electrode part gaps 45. However, not being limited to such a configuration, part of the drive dummy part 31DD may be configured to be located in at least one of the electrode part gaps 45. With this configuration as well, those electrode part gaps 45 in which part of the drive dummy part 31DD is located among the electrode part gaps 45 can provide advantages equivalent to those in (7).

On the sensing surface 33S, part of the sensing dummy part 33SD has been located in all the electrode part gaps 55. However, not being limited to such a configuration, part of the sensing dummy part 33SD may be configured to be located in at least one of the electrode part gaps 55. With this configuration as well, those electrode part gaps 55 in which part of the sensing dummy part 33SD is located among the electrode part gaps 55 can provide advantages equivalent to those in (8).

On the drive surface 31S, the position of the electrode wire gap 46 only has to be set according to the magnitude of the electrostatic capacitance across the drive capacitive electrode part 31DPa and the sensing capacitive electrode part 33SPa, for example. In the first direction D1, as the distance between the electrode wire gap 46 and the dummy wire gap 47 closest to the electrode wire gap 46 becomes larger, the area of the drive capacitive electrode part 31DPa becomes smaller. Accordingly, the electrostatic capacitance across the drive capacitive electrode part 31DPa and the sensing capacitive electrode part 33SPa is decreased.

On the sensing surface 33S, the position of the electrode wire gap 56 only has to be set according to the magnitude of the electrostatic capacitance across the drive capacitive electrode part 31DPa and the sensing capacitive electrode part 33SPa, for example. In the second direction D2, as the distance between the electrode wire gap 56 and the dummy wire gap 57 closest to the electrode wire gap 56 becomes larger, the area of the sensing capacitive electrode part 33SPa becomes smaller. Accordingly, the electrostatic capacitance across the drive capacitive electrode part 31DPa and the sensing capacitive electrode part 33SPa is decreased.

Of the plurality of drive capacitive electrode parts 31DPa located on the drive surface 31S, the electrode part gaps 45 may be located only on the outer edges of part of the drive capacitive electrode parts 31DPa. With this configuration as well, in the drive capacitive electrode part 31DPa adjacent to the electrode part gap 45, advantages equivalent to those in (7) can be obtained.

Of the plurality of sensing capacitive electrode parts 33SPa located on the sensing surface 33S, the electrode part gaps 55 may be located only on the outer edges of part of the sensing capacitive electrode parts 33SPa. With this configuration as well, in the sensing capacitive electrode part 33SPa adjacent to the electrode part gap 55, advantages equivalent to those in (8) can be obtained.

While electrode part gap 45 is located on the drive surface 31S, the electrode part gap 55 may be absent from the sensing surface 33S. With this configuration as well, the electrode part gap 45 is located between the drive capacitive electrode part 31DPa and the sensing capacitive electrode part 33SPa, in plan view perpendicular to the sensing surface 33S. Accordingly, advantages equivalent to those in (7) can be obtained more than a little.

While the electrode part gap 55 is located on the sensing surface 33S, the electrode part gap 45 may be absent from the drive surface 31S. With this configuration as well, the electrode part gap 55 is located between the drive capacitive electrode part 31DPa and the sensing capacitive electrode part 33SPa. Accordingly, advantages equivalent to those in (8) can be greatly obtained.

The configurations of the second embodiment and the modifications of the second embodiment may each be implemented in combination with each of the configurations of the modifications of the first embodiment.

Third Embodiment

Referring to FIGS. 15 to 18, a third embodiment embodying a touch sensor electrode, a touch panel, and a display device will be described. The third embodiment is different from the first embodiment in the configuration of drive electrode wires configuring a drive electrode and the configuration of sensing electrode wires configuring a sensing electrode. Therefore, in the following, differences will be described in detail, and details of the configurations common to those of the first embodiment will be omitted, by designating the same reference signs as those of the first embodiment to the configurations common the first embodiment. In the following, the configurations of a drive electrode and a touch sensor electrode, and advantageous effects of the touch sensor electrode will be described in this order.

Configuration of the Drive Electrode

Figure 15:
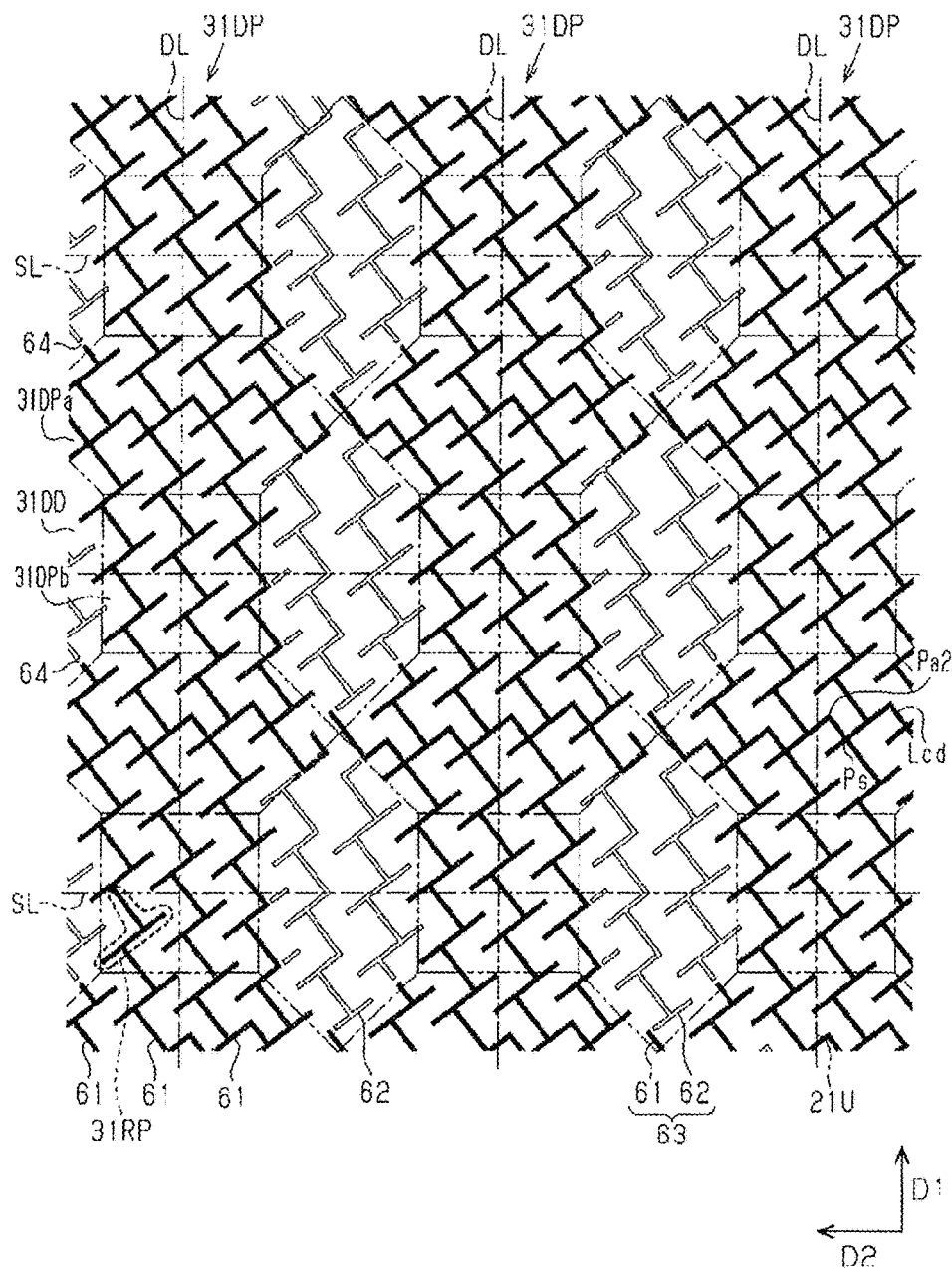
FIG. 15 is a plan view illustrating an arrangement of drive electrode wires according to a third embodiment.
Figure 16:
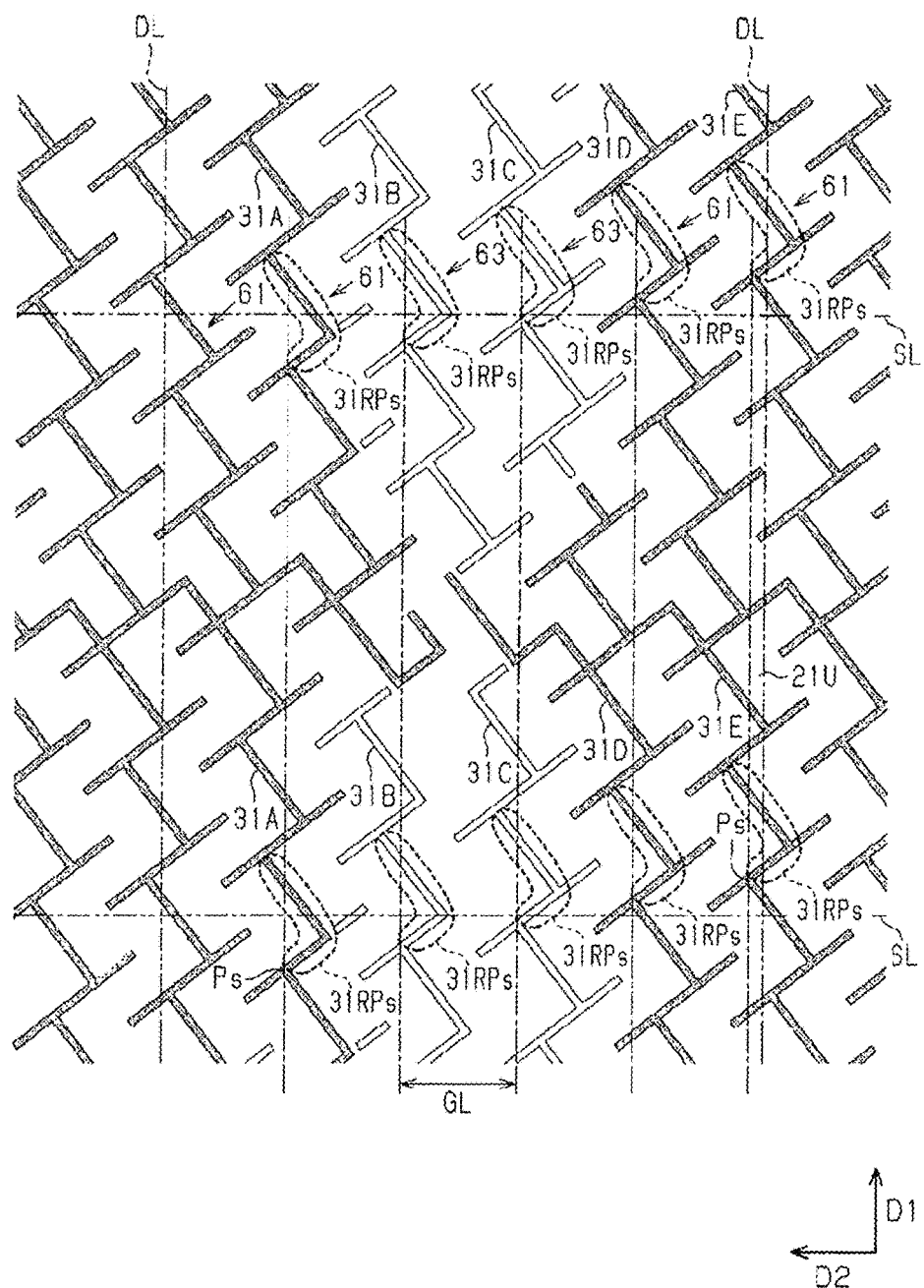
FIG. 16 is a partially enlarged view illustrating an arrangement of the drive electrode wires of FIG. 15.

Referring to FIGS. 15 and 16, a configuration of the drive electrode will be described. In FIG. 15, the width of each drive electrode wire is exaggeratedly depicted, for the sake of convenience in describing the arrangement of a plurality of drive electrode wires configuring a drive electrode 31DP. In FIG. 16, part of the drive electrode 31DP of FIG. 15 is shown being enlarged.

As shown in FIG. 15, a drive electrode 31DP includes a plurality of drive capacitive electrode parts 31DPa arrayed along the first direction D1 and drive connecting parts 31DPb each connecting two drive capacitive electrode parts 31DPa adjacent to each other. A plurality of drive electrodes 31DP are arranged along the second direction D2.

In the drive electrode 31DP, each of the drive capacitive electrode parts 31DPa and each of the drive connecting parts 31DPb are configured of a plurality of drive electrode wires 61. Each drive electrode 31DP is a set of a plurality of drive electrode wires 61. Each drive electrode wire 61 includes a plurality of reference pattern elements 31RP whose reference direction is the second direction D2, for example.

Each drive capacitive electrode part 31DPa includes five drive electrode wires 61, for example, equally spaced along the second direction D2, with each drive electrode wire 61 extending along the first direction D1. Each drive connecting part 31DPb includes three drive electrode wires 61, for example, equally spaced along the second direction D2, with each drive electrode wire 61 extending along the first direction D1.

Of the five drive electrode wires 61 configuring each drive capacitive electrode part 31DPa, three contiguously arrayed in the second direction D2 are respectively connected to the three drive electrode wires 61 configuring the drive connecting part 31DPb.

In each drive capacitive electrode part 31DPa, five drive electrode wires 61 arrayed along the second direction D2 are each connected to the adjacent drive electrode wire 61 via a drive connecting wire Lcd extending along the extending direction.

For example, each drive connecting wire Lcd extends from a second auxiliary end point Pa2 of a reference pattern element 31RP of one drive electrode wire 61 towards a secondary end point Ps of a reference pattern element 31RP of the other drive electrode wire 61. In a drive capacitive electrode part 31DPa, four drive connecting wires Lcd configure a drive connecting wire group. The drive connecting wire group is continuously arranged along the first direction D1 for each drive capacitive electrode part 31DPa.

Drive dummy parts 31DD are located between two drive electrodes 31DP adjacent to each other in the second direction D2. Each drive dummy part 31DD is located between two contiguous drive capacitive electrode parts 31DPa of one drive electrode 31DP and two contiguous drive capacitive electrode parts 31DPa of the other drive electrode 31DP.

Each drive dummy part 31DD includes two drive dummy wires 62, for example, equally spaced along the second direction D2, with each drive dummy wire 62 extending along the first direction D1. Each drive dummy wire 62 includes a plurality of reference pattern elements 31RP whose reference direction is the second direction D2.

In the first direction D1, the drive dummy parts 31DD and part of the drive capacitive electrode parts 31DPa are alternately and contiguously arrayed. On part of the drive surface 31S, the drive dummy wires 62 configuring the drive dummy parts 31DD and the drive electrode wires 61 configuring the drive capacitive electrode parts 31DPa are alternately and contiguously arrayed in the first direction D1. The drive electrode wires 61 and the drive dummy wires 62, which are alternately and contiguously arranged in the first direction D1, configure a drive pattern group 63. The drive electrode wire 61 and the drive dummy wire 62 adjacent to each other in the first direction D1 include a common part of a reference pattern element 31RP.

In the drive pattern group 63, a drive gap 64 is provided between an end portion of a drive electrode wire 61 and an end portion of a drive dummy wire 62 in the first direction D1. The drive gap 64 separates the drive electrode wire 61 from the drive dummy wire 62. Thus, the drive dummy part 31DD is distanced from the drive electrode 31DP.

In FIG. 15, a straight line passing through the center in the second direction D2 of each of the drive electrodes 31DP and extending along the first direction D1 is a drive straight line DL. Of the drive straight lines DL, two drive straight lines DL adjacent to each other in the second direction D2 sandwich a region therebetween which is a drive electrode wire region. On the other hand, a straight line passing through the center in the first direction of each of sensing electrodes 33SP and extending along the second direction D2 is a sensing straight line SL. Of the sensing straight lines SL, two sensing straight lines SL adjacent to each other in the first direction D1 sandwich a region therebetween which is a sensing electrode wire region.

In plan view perpendicular to a sensing surface 33S, a region where a drive electrode wire region three-dimensionally overlaps a sensing electrode wire region is a unit region 21U. The unit regions 21U are contiguously arranged along the first and second directions D1 and D2.

As shown in FIG. 16, two drive electrode wires 61 arrayed along the second direction D2 and three drive pattern groups 63 are allocated to each unit region 21U. The drive electrode wires 61 located at both ends in the second direction D2 sandwich the three drive pattern groups 63. The two drive electrode wires 61 and the three drive pattern groups 63 are equally spaced from each other in the second direction D2.

In each unit region 21U, the two drive electrode wires 61 and the three drive pattern groups 63 configure a drive wiring group. The drive wiring group is continuously provided in the first direction D1 in each unit region 21U.

Five reference pattern elements 31RP arrayed along the first direction D1 are allocated to the drive electrode wires 61 configuring the drive wiring group in a unit region 21U. Similar to the drive electrode wires 61, five reference pattern elements 31RP arrayed along the first direction D1 are allocated to the drive pattern groups 63 configuring the drive wiring group in a unit region 21U. In each of two drive electrode wires 61 and three drive pattern groups 63, the reference pattern element 31RP located at an end in the first direction D1 is a starting point pattern element 31RPs. The starting point pattern element 31RPs of the unit regions 21U on the drive surface 31S is an example of a first starting point pattern element.

In the unit region 21U, the distance between two starting point pattern elements 31RPs adjacent to each other in the second direction D2 is an inter-wire width GL. For example, the inter-wire width GL is a distance, along the second direction D2, between the secondary end points Ps of the starting point pattern elements 31RPs.

In each reference pattern element 31RP in each of the drive electrode wires 61 and the drive pattern groups 63, a primary wire Lm and a secondary wire Ls form a reference pattern element 31RP. Also, a pattern having a gap between the primary wire Lm and the secondary wire Ls or having a gap midway of the primary wire Lm is also taken to be included in the reference pattern elements 31RP.

In each drive wiring group, the drive electrode wires 61 and the drive pattern groups 63 included in the drive wiring group are an A wiring 31A, a B wiring 31B, a C wiring 31C, a D wiring 31D, and an E wiring 31E, from the drive electrode wire 61 located at an end in the second direction D2.

In a unit region 21U, the position of the starting point pattern element 31RPs is determined for each of the A wiring 31A to the E wiring 31E. Five starting point pattern elements 31RPs configure a starting point pattern element group. The starting point pattern element groups are continuously provided along the first direction D1 in each unit region 21U. The positions of the starting point pattern elements 31RPs are the same between the plurality of the respective unit regions 21U. Thus, in the plurality of unit regions 21U continuously arranged in the first direction D1, a plurality of starting point pattern elements 31RPs are arrayed along the first direction D1.

The plurality of reference pattern elements 31RP connected to the starting point pattern element 31RPs of the B wiring 31B extend towards the starting point pattern element 31RPs of the A wiring 31A of the unit region 21U adjacent in the first direction D1. The plurality of reference pattern elements 31RP connected to the starting point pattern element 31RPs of the C wiring 31C extend towards the starting point pattern element 31RPs of the B wiring 31B of the unit region 21U adjacent in the first direction D1.

In other words, the plurality of reference pattern elements 31RP connected to a starting point pattern element 31RPs extend towards another starting point pattern element 31RPs located at a position shifted by one inter-wire width GL in the second direction D2. Thus, in each unit region 21U, each of the wirings configuring the drive wiring group extends from the starting point pattern element 31RPs towards the starting point pattern element 31RPs of the unit region 21U adjacent in the first direction D1 so as to incline by the inter-wire width GL.

The drive electrode wires 61 and the drive pattern groups 63 configuring each drive wiring group extend from the respective starting point pattern elements 31RPs in directions parallel to each other. Thus, the distance between two drive electrode wires 61 and the distance between a drive electrode wire 61 and a drive pattern group 63 are kept to the inter-wire width GL.

Configuration of the Sensing Electrode

Figure 17:
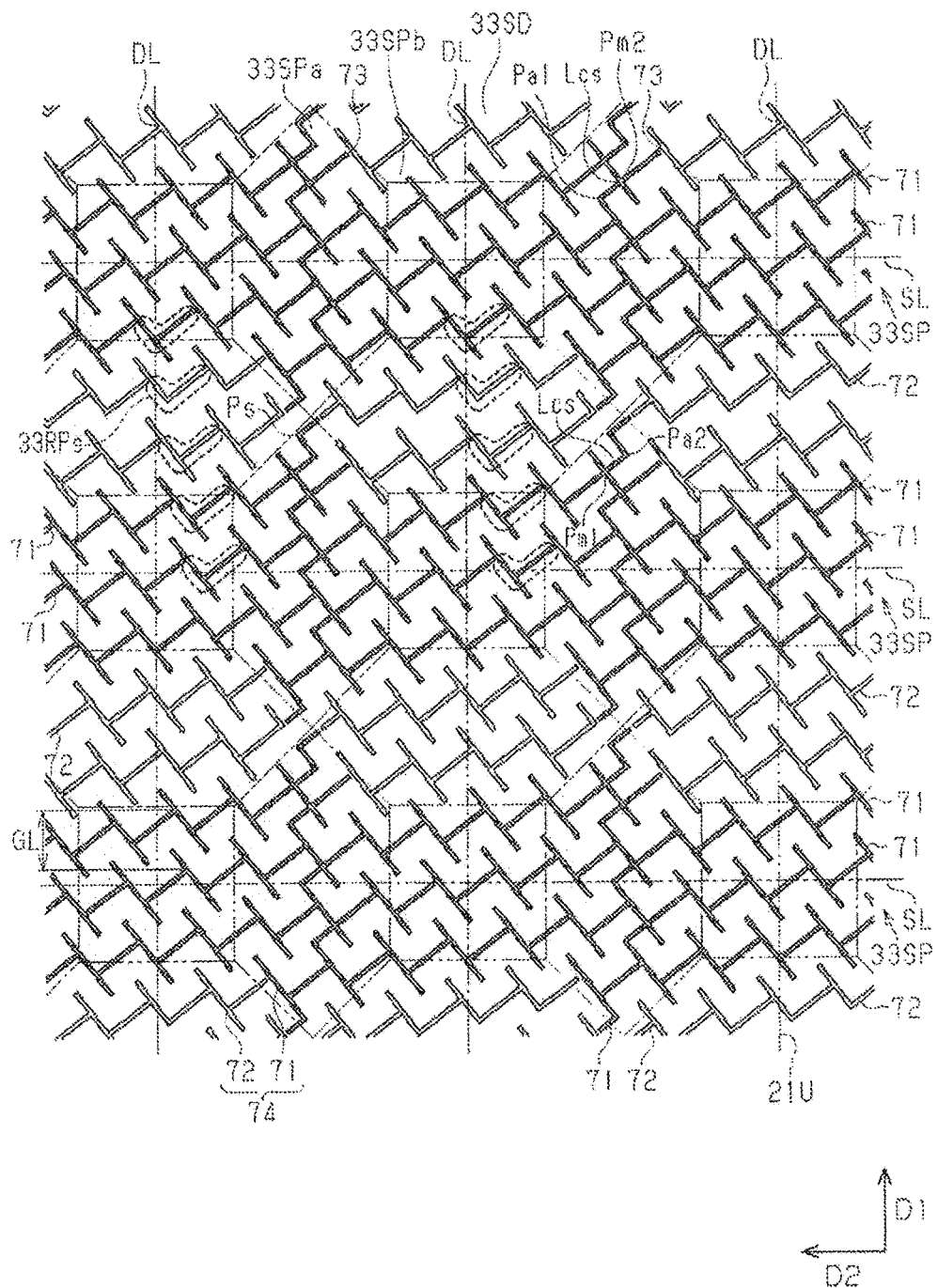
FIG. 17 is a plan view illustrating an arrangement of sensing electrode wires according to the third embodiment.

Referring to FIG. 17, a configuration of the sensing electrode will be described. In FIG. 17, the width of each sensing electrode wire is exaggeratedly depicted for the sake of convenience in describing the arrangement of a plurality of sensing electrode wires configuring the sensing electrodes 33SP.

As shown in FIG. 17, a sensing electrode 33SP includes a plurality of sensing capacitive electrode parts 33SPa arrayed along the second direction D2 and sensing connecting parts 33SPb each connecting two sensing capacitive electrode parts 33SPa adjacent to each other. A plurality of sensing electrodes 33SP are arranged along the first direction D1.

In the sensing electrode 33SP, each of the sensing capacitive electrode parts 33SPa and each of the sensing connecting parts 33SPb are configured of a plurality of sensing electrode wires 71. Each of the sensing electrodes 33SP is a set of the sensing electrode wires 71. Each sensing electrode wire 71 includes a plurality of reference pattern elements 33RP whose reference direction is the first direction D1, for example.

Each sensing capacitive electrode part 33SPa includes five sensing electrode wires 71, for example, equally spaced along the first direction D1, with each sensing electrode wire 71 extending along the second direction D2. Each sensing connecting part 33SPb includes three sensing electrode wires 71, for example, equally spaced along the first direction D1, with each sensing electrode wire 71 extending along the second direction D2.

Of the five sensing electrode wires 71 configuring the sensing capacitive electrode part 33SPa, three contiguously arrayed in the first direction D1 are respectively connected to the three sensing electrode wires 71 configuring the sensing connecting part 33SPb.

In the sensing capacitive electrode part 33SPa, the five sensing electrode wires 71 arrayed along the first direction D1 are each connected to the adjacent sensing electrode wire 71 by a sensing connecting wire Lcs extending along the direction perpendicular to the extending direction.

Some of the sensing connecting wires Lcs extend from a second primary end point Pm2 of the reference pattern element 33RP of one sensing electrode wire 71 towards a first auxiliary end point Pa1 of the reference pattern element 33RP of the sensing electrode wire 71 adjacent in the first direction D1, for example.

The rest of the sensing connecting wire Lcs extends from the second primary end point Pm2 of the reference pattern element 33RP of one sensing electrode wire 71 towards the first primary end point Pm1 of the reference pattern element 33RP of the sensing electrode wire 71 adjacent in the first direction D1, for example.

In a sensing capacitive electrode part 33SPa, four sensing connecting wires Lcs configure a sensing connecting wire group. The sensing connecting wire groups are contiguously arrayed along the second direction D2 in each sensing capacitive electrode part 33SPa.

Sensing dummy parts 33SD are located between two sensing electrodes 33SP adjacent to each other in the first direction D1. Each sensing dummy part 33SD is located between two sensing capacitive electrode parts 33SPa contiguously arranged in one sensing electrode 33SP and two sensing capacitive electrode parts 33SPa contiguously arrayed in the other sensing electrode 33SP.

Each sensing dummy part 33SD includes two sensing dummy wires 72, for example, equally spaced along the first direction D1, with each sensing dummy wire 72 extending along the second direction D2. Each sensing dummy wire 72 includes a plurality of reference pattern elements 33RP whose reference direction is the first direction D1.

In the second direction D2, the sensing dummy wires 72 configuring the sensing dummy part 33SD are sandwiched between two sensing electrode wires 71. In the second direction D2, a sensing gap 73 is provided between an end of a sensing electrode wire 71 and an end of the adjacent sensing dummy wire 72. One sensing dummy wire 72 is separated from the sensing electrode wire 71 by two sensing gaps 73 contiguously provided in the second direction. Thus, the sensing dummy part 33SD is distanced from the sensing electrode 33SP.

On the sensing surface 33S, two sensing electrode wires 71 arranged along the first direction D1 and three sensing pattern groups 74 are allocated to each of the unit regions 21U. The three sensing pattern groups 74 include part of the sensing electrode wires 71 and part of the sensing dummy wires 72 arrayed along the second direction D2. In each unit region 21U, the sensing electrode wires 71 located at both ends in the first direction D1 sandwich the three sensing pattern groups 74. The two sensing electrode wires 71 and the three sensing pattern groups 74 are equally spaced from each other in the first direction D1. The gap between two sensing electrode wires 71 or the gap between the sensing electrode wire 71 and the sensing pattern group 74 is an inter-wire width GL.

In each unit region 21U, the two sensing electrode wires 71 and the three sensing pattern groups 74 configure a sensing wiring group. The sensing wiring groups are contiguously located in the second direction D2 in each unit region 21U.

Similar to the unit region 21U on the drive surface 31S, of the plurality of reference pattern elements 33RP included in the wirings of a unit region 21U, one located at an end in the second direction D2 is a starting point pattern element 33RPs. The plurality of reference pattern elements 33RP connected to a starting point pattern element 33RPs extend towards the starting point pattern element 33RPs at a position shifted by one inter-wire width GL in the first direction D1. The starting point pattern element 33RPs of the unit region 21U on the sensing surface 33S is an example of a second starting point pattern element.

Configuration of the Touch Sensor Electrode

Figure 18:
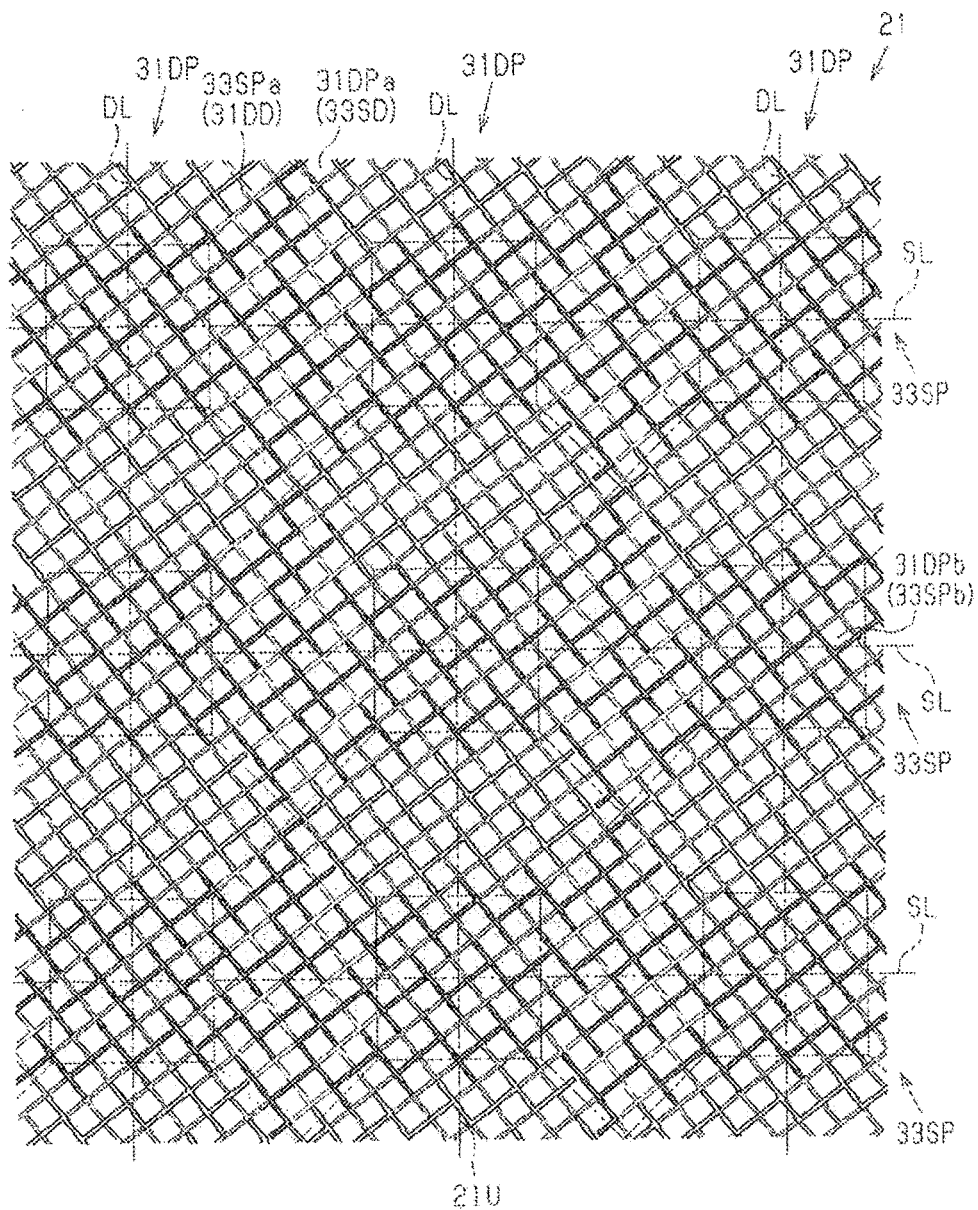
FIG. 18 is a plan view illustrating a relationship between an arrangement of the drive electrode wires and that of the sensing electrode wires according to the third embodiment.

Referring to FIG. 18, a configuration of the touch sensor electrode will be described. In FIG. 18, the width of each drive electrode wire and the width of each sensing electrode wire are exaggeratedly depicted for the sake of convenience in describing the arrangement of a plurality of drive electrode wires configuring each drive electrode 31DP and the arrangement of a plurality of sensing electrode wires configuring each sensing electrode 33SP.

As shown in FIG. 18, in the touch sensor electrode 21, the drive capacitive electrode parts 31DPa overlap the respective sensing dummy parts 33SD, the sensing capacitive electrode parts 33SPa overlap the respective drive dummy parts 31DD, and the drive connecting parts 31DPb overlap the respective sensing connecting part 33SPb, in plan view perpendicular to the sensing surface 33S. Thus, there is formed a lattice pattern where lattice units each having a square shape are contiguously arranged.

In each unit region 21U on the drive surface 31S, a plurality of reference pattern elements 31RP connected to each starting point pattern element 31RPs extend towards the starting point pattern element 31RPs located at a position shifted by one inter-wire width GL in the second direction D2. In each unit region 21U on the sensing surface 33S, a plurality of reference pattern elements 33RP connected to each starting point pattern element 33RPs extend towards the starting point pattern element 33RPs located at a position shifted by one inter-wire width GL in the first direction D1.

Thus, while the lattice units contiguously arranged in a lattice pattern formed on the touch sensor electrode 21 include the reference pattern elements 31RP and 33RP of the first embodiment, the primary wire angle θ formed between a primary wire Lm configuring a lattice unit and the reference direction is different from that of the touch sensor electrode 21 of the first embodiment.

Advantageous Effects of the Touch Sensor Electrode

Advantageous effects of the foregoing touch sensor electrode will be described.

The touch sensor electrode 21 of the present embodiment can be formed, as follows, by only changing the design of the touch sensor electrode 21 of the first embodiment. Specifically, the positions of the starting point pattern element 31RPs are set in terms of the second direction D2 in the wirings configuring a drive wiring group of a unit region 21U. The extending direction of a plurality of reference pattern elements 31RP connected to each starting point pattern element 31RPs is changed towards another starting point pattern element 31RPs located at a position shifted by n times the inter-wire width GL in the second direction D2 (n is an integer one or more).

The positions of the starting point pattern elements 33RPs are set in terms of the first direction D1 in the wirings configuring the sensing wiring group of a unit region 21U. The extending direction of a plurality of reference pattern elements 33RP connected to each starting point pattern element 33RPs of a unit region 21U is changed towards another starting point pattern element 33RPs at a position shifted by n times the inter-wire width GL in the first direction D1 (n is an integer one or more). A plurality of drive wiring groups contiguously arranged in the first direction D1 is connected to a plurality of sensing wiring groups contiguously arranged in the second direction D2 such that they form a lattice pattern in plan view perpendicular to the sensing surface 33S.

As described above, to obtain the touch sensor electrode 21 forming a lattice pattern, significant design change is not necessary in the drive electrodes 31DP and the drive dummy parts 31DD on the drive surface 31S, and the sensing electrodes 33SP and the sensing dummy parts 33SD on the sensing surface 33S.

As described above, the following advantages can be obtained according to the third embodiment.

(9) If the inclinations of the plurality of line segments configuring the lattice pattern are changed relative to the first and second directions D1 and D2, positions are assigned to the drive electrode wires 61 and the sensing electrode wires 71 as electrode wires including the reference pattern elements 31RP and 33RP. Therefore, loads involved in designing the drive electrode wires 61 and the sensing electrode wires 71 can be reduced.

Modifications of Third Embodiment

The third embodiment described above can also be appropriately modified and implemented as follows.

In a unit region 21U on the drive surface 31S, a plurality of reference pattern elements 31RP connected to the starting point pattern element 31RPs of the C wiring 31C may extend towards the starting point pattern element 31RPs of the A wiring 31A in the unit region 21U adjacent in the first direction D1. Alternatively, a plurality of reference pattern elements 31RP connected to the starting point pattern element 31RPs of the D wiring 31D may extend towards the starting point pattern element 31RPs of the A wiring 31A in the unit region 21U adjacent in the first direction D1.

In short, a plurality of reference pattern elements 31RP connected to a starting point pattern element 31RPs only need to extend towards the starting point pattern element located at a position shifted by an integral multiple of the inter-wire width GL in the second direction D2. In the unit regions 21U on the sensing surface 33S, the extending direction of the plurality of reference pattern elements 31RP connected to the starting point pattern element 31RPs in each wiring only needs to be determined according to the unit regions 21U on the drive surface 31S. With this configuration as well, advantages equivalent to those in (9) can be obtained.

The number of wirings configuring a drive wiring group and the number of wirings configuring a sensing wiring group can be changed as desired, as long as a lattice pattern can be formed.

The configurations of the third embodiment and the modifications thereof can each also be implemented in combination with each of the configurations of the modifications of the first embodiment.

The configurations of the third embodiment and the modifications thereof can also be implemented in combination with each of the configurations of the second embodiment and the modifications thereof.

Other Exemplary Modifications

Figure 19:
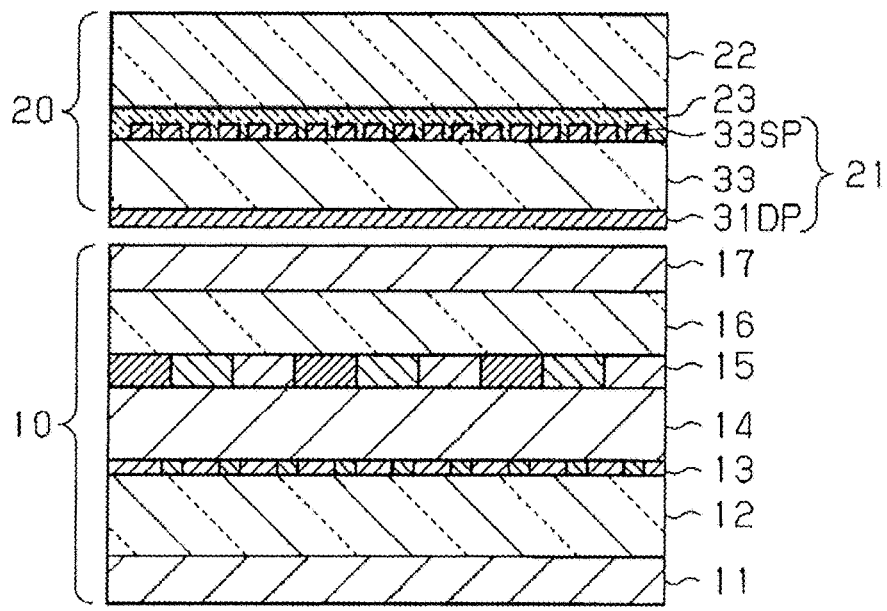
FIG. 19 is a cross-sectional view illustrating a cross-sectional structure of a display device according to another modification.

As shown in FIG. 19, the transparent substrate 31 and the transparent adhesive layer 32 may be omitted from the touch sensor electrode 21 configuring the touch panel 20. In this configuration, of the surfaces of the transparent dielectric substrate 33, a surface facing the display panel 10 may be assigned as the drive surface 31S, and the drive electrode 31DP may be located on the drive surface 31S. The sensing electrode 33SP may be located on a surface of the transparent dielectric substrate 33, opposite to the drive surface 31S.

With this configuration, the drive electrode 31DP is formed by patterning a thin film formed on the drive surface 31S, for example.

Figure 20:
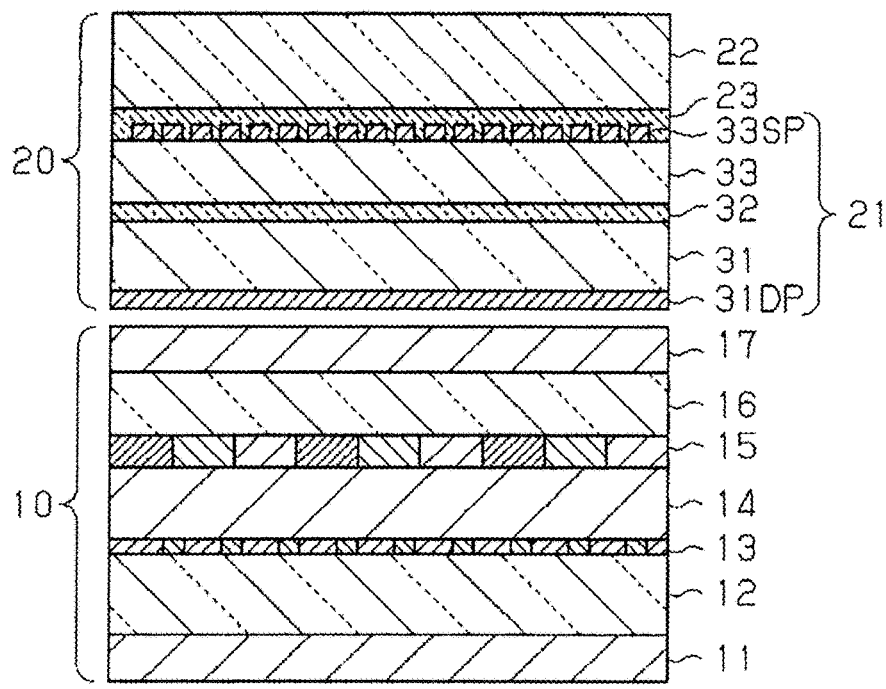
FIG. 20 is a cross-sectional view illustrating a cross-sectional structure of a display device according to another modification.

As shown in FIG. 20, components of the touch panel 20 may be located in the order of, from those closer to the display panel 10, the drive electrode 31DP, the transparent substrate 31, the transparent adhesive layer 32, the transparent dielectric substrate 33, the sensing electrode 33SP, the transparent adhesive layer 23, and the cover layer 22.

In this configuration, for example, the drive electrode 31DP is formed on the drive surface 31S that is a surface of the transparent substrate 31, and the sensing electrode 33SP is formed on the sensing surface 33S that is a surface of the transparent dielectric substrate 33. A surface of the transparent substrate 31, facing the drive surface 31S is bonded to a surface of the transparent dielectric substrate 33, facing the sensing surface 33S, via the transparent adhesive layer 32.

The touch panel 20 and the display panel 10 do not have to be separately formed. The touch panel 20 may be integrally formed with the display panel 10. This configuration can serve as an in-cell configuration, for example, in which a plurality of drive electrodes 31DP of the touch sensor electrode 21 are located on the TFT layer 13, while a plurality of sensing electrodes 33SP are located between the color filter substrate 16 and the upper polarizer 17. Alternatively, this configuration can serve as an on-cell configuration in which the touch sensor electrode 21 is located between the color filter substrate 16 and the upper polarizer 17.

In a touch panel having capacitive electrode parts, the accuracy of detecting a position may be enhanced by allowing the first capacitive electrode parts not to overlap the second capacitive electrode parts when viewed from the front surface of the transparent dielectric layer. On the other hand, when the transparent dielectric layer is located between the first and second electrodes, the color of the capacitive electrode parts of the first electrode looks considerably different from the color of the capacitive electrode parts of the second electrode when viewed from the front surface of the transparent dielectric layer, as far as the transparent dielectric layer is intervened between these two electrodes, if the electrodes are formed of the same material. As a result, the first and second electrodes are visually recognized as separate structures. In particular, when the material forming the first electrode has a configuration different from that of the material forming the second electrode, or when the surface state of the first electrode is different from that of the second electrode, the boundary between the first and second electrodes is more easily visually recognized.

An aspect of the present invention is to provide a touch sensor electrode, a touch panel, and a display device that can reduce lowering of the accuracy in detecting a position and can reduce the occurrence of visually recognizing the first and second electrodes as separate structures.

A mode of a touch sensor electrode includes: a transparent dielectric substrate having a first surface and a second surface on an opposite side to the first surface, a plurality of first electrodes arrayed on the first surface along a second direction intersecting a first direction, a plurality of second electrodes arrayed on the second surface along the first direction, a plurality of first dummy parts each including a plurality of first dummy wires, and a plurality of second dummy parts each including a plurality of second dummy wires. Each of the first electrodes is a set of a plurality of first electrode wires, and includes a plurality of first capacitive electrode parts arrayed along the first direction and first connecting parts each connecting between the first capacitive electrode parts adjacent to each other. Each of the second electrodes is a set of a plurality of second electrode wires, and includes a plurality of second capacitive electrode parts arrayed along the second direction, and second connecting parts each connecting between the second capacitive electrode parts adjacent to each other. Each of the first dummy parts is located between two of the first electrodes adjacent to each other on the first surface, and separated from the first electrodes. Each of the second dummy parts is located between two of the second electrodes adjacent to each other on the second surface, and separated from the second electrodes. In plan view perpendicular to the transparent dielectric substrate, the first capacitive electrode parts face the respective second dummy parts, and the second capacitive electrode parts face the respective first dummy parts. In the plan view, a combination of the first electrode wires and the second dummy wires configures a first section of a lattice pattern, and line segments configured by the first electrode wires included in the lattice pattern are different from line segments configured by the second dummy wires included in the lattice pattern. In the plan view, a combination of the second electrode wires and the first dummy wires configures a second section of the lattice pattern, and the second electrode wires configure line segments different from line segments configured by the first dummy wires in the lattice pattern.

A mode of a touch panel includes: the touch sensor electrode described above including a plurality of the first electrodes, a plurality of the second electrodes, and a transparent dielectric layer sandwiched between the plurality of first electrodes and the plurality of second electrodes; a cover layer that covers the touch sensor electrode; and a peripheral circuit that measures electrostatic capacitance across the second electrodes.

A mode of a display device includes a display panel that displays information, the touch panel described above, and a drive circuit that drives the touch pane. In the display device, the touch panel is configured to transmit the information displayed on the display panel.

According to the mode, in plan view perpendicular to the transparent dielectric substrate, a combination of the first electrode wires and the second dummy wires forms a lattice pattern, and a combination of the second electrode wires and the first dummy wires forms a lattice pattern. Thus, the color of the first electrodes and the color of the second electrodes are unlikely to be individually recognized. Therefore, if the color of the first electrodes is different from the color of the second electrodes, the difference is unlikely to be noticeable. As a result, the boundary between the first and second electrodes is unlikely to be visually recognized, and the first and second electrodes are unlikely to be visually recognized.

Moreover, in the first and second electrodes, electrostatic capacitance is formed across the first and second capacitive electrode parts which do not overlap each other in plan view perpendicular to the transparent dielectric substrate. The capacitance portion across the first and the second capacitive electrode parts is easily electrically affected from outside the transparent dielectric substrate. Consequently, when an electric conductor approaches the touch sensor electrode, the electrostatic capacitance across the first and second capacitive electrode parts is easily changed. Accordingly, the accuracy of detecting the position of the electric conductor with respect to the touch sensor electrode is enhanced.

In another mode of the touch sensor electrode described above, it is preferable that each of a plurality of lattice units configuring the lattice pattern is configured of four line segments; the four line segments in the first section of the lattice pattern include part of the first electrode wire and part of the second dummy wire; and the four line segments in the second section of the lattice pattern include part of the second electrode wire and part of the first dummy wire.

According to another mode of the touch sensor electrode described above, the lattice unit is configured of part of the first electrode wire and part of the second dummy wire in the first section of the lattice pattern, and the lattice unit is configured of part of the second electrode wire and part of the first dummy wire in the second section of the lattice pattern. Accordingly, in plan view perpendicular to the transparent dielectric substrate, the first electrodes located on the first surface and the second electrodes located on the second surface are more unlikely to be recognized as separate structures.

In another mode of the touch sensor electrode described above, in the lattice pattern, a lattice unit has a square shape, and each of the first electrode wires and each of the second dummy wires include a plurality of reference pattern elements. Each of the reference pattern elements includes a primary wire and a secondary wire, the primary wire extending along an extending direction forming a predetermined angle relative to a reference direction, which can be any direction, the primary wire having a length that is twice the length of a side of the lattice unit, the secondary wire extending along a direction perpendicular to the extending direction, the secondary wire having a length equal to a length of a side of the unit lattice. It is preferable that, in each of the first electrode wires, the reference direction is the second direction, and the plurality of reference pattern elements are arrayed along the first direction. It is preferable that, in each of the second dummy wires, the reference direction is the first direction, and the plurality of reference pattern elements are arrayed along the second direction.

In still another mode of the touch sensor electrode described above, each of the second electrode wires and each of the first dummy wires include a plurality of the reference pattern elements. It is preferable that, in each of the second electrode wires, the reference direction is the first direction, and the plurality of reference pattern elements are arrayed along the second direction, and it is preferable that, in each of the first dummy wires, the reference direction is the second direction, and the plurality of reference pattern elements are arrayed along the first direction.

According to another mode of the touch sensor electrode, each of the first electrode wires and each of the second electrode wires include a plurality of reference pattern elements. Thus, designing the first and second electrodes is easy.

In another mode of the touch sensor electrode described above, it is preferable that the predetermined angle is greater than 0° and smaller than 180°.

According to another mode of the touch sensor electrode described above, each of a plurality of line segments configuring a lattice pattern can be inclined relative to the first direction and the second direction.

In another mode of the touch sensor electrode described above, the first direction and the second direction are perpendicular to each other, a straight line passing through a center in the second direction of each of the first electrodes is a first straight line, a straight line passing through a center in the first direction of each of the second electrodes is a second straight line, and a region in a rectangular shape surrounded by two of the first straight lines adjacent to each other and two of the second straight lines adjacent to each other is a unit region. In the unit region, the reference pattern element located at an end in the first direction among the plurality of reference pattern elements included in each of the first electrodes wires is a first starting point pattern element, and the reference pattern element located at an end in the second direction among the plurality of reference pattern elements included in each of the second electrodes wires is a second starting point pattern element. A plurality of the first starting point pattern elements are continuously provided along the first direction in each of the unit regions, and a plurality of the second starting point pattern elements are continuously provided along the second direction in each of the unit regions. It is preferable that a plurality of the reference pattern elements connected to one of the first starting point pattern elements extend towards another one of the first starting point pattern elements in the unit region adjacent in the first direction, and a plurality of the reference pattern elements connected to one of the second starting point pattern elements extends towards another one of the second starting point pattern elements in the unit region adjacent in the second direction.

According to another mode of the touch sensor electrode described above, if the inclination of each of a plurality of line segments configuring the lattice pattern is changed relative to the first or second direction, positions can be assigned to the first and second electrode wires as electrode wires including the reference pattern elements. Therefore, loads involved in designing the first and second electrode wires can be reduced.

In another mode of the touch sensor electrode described above, in plan view perpendicular to the transparent dielectric substrate, the first electrodes, the first dummy parts, the second electrodes, and the second dummy parts have the same hue. On the other hand, brightness and/or saturation of the first electrodes and the first dummy parts is different from brightness and/or saturation of the second electrodes and the second dummy parts.

According to another mode of the touch sensor electrode described above, the difference in color of the first electrodes and the first dummy parts from the second electrodes and the second dummy parts is unlikely to be significant, compared with a configuration in which the first electrodes and the first dummy parts have a hue different from that of the second electrodes and the second dummy parts.

In another mode of the touch sensor electrode described above, in plan view perpendicular to the transparent dielectric substrate, the first electrodes and the first dummy parts have the same color attributes, and the second electrodes and the second dummy parts have color attributes different from those of the first electrodes.

In the configuration in which the first electrodes and the first dummy parts have the same color attributes, and the second electrodes and the second dummy parts have color attributes different from those of the first electrodes, the first and second electrodes are likely to be visually recognized as structures different from each other. In this regard, according to another mode of the touch sensor electrode described above, if the color attribute of the second electrodes and the second dummy parts are different from those of the first electrodes and the first dummy parts, the color of the first electrodes and the first dummy parts and the color of the second electrodes and the second dummy parts are unlikely to be individually visually recognized. Accordingly, the first and second electrodes are pronouncedly prevented from being visually recognized as structures different from each other In another mode of the touch sensor electrode described above, it is preferable that the touch sensor electrode further includes an electrode part gap located between the first capacitive electrode part and the second capacitive electrode part in plan view perpendicular to the transparent dielectric substrate, wherein part of the first dummy part is located in at least one of a plurality of the electrode part gaps.

In another mode of the touch sensor electrode described above, it is preferable that the touch sensor electrode further includes an electrode part gap located between the first capacitive electrode part and the second capacitive electrode part in plan view perpendicular to the transparent dielectric substrate, wherein part of the second dummy part is located on at least one of a plurality of the electrode part gaps.

According to another mode of the touch sensor electrode described above, portions in the transparent dielectric substrate functioning as capacitance components between the first and second capacitive electrode parts are likely to be affected from outside the transparent dielectric substrate. Accordingly, the capacitance across the first and second capacitive electrode parts is easily changed by the approach of a finger or the like to the touch sensor electrode.

An embodiment of the present invention can reduce lowering of accuracy in detecting a position is reduced, and can also reduce occurrence of visually recognizing the first and second electrodes are as separate structures.

REFERENCE SIGNS LIST

10 . . . Display panel
10S . . . Display surface
11 . . . Lower polarizer
12 . . . Thin film transistor substrate
13 . . . TFT layer
14 . . . Liquid crystal layer
15 . . . Color filter layer
15a . . . Black matrix
15P . . . Pixel
15G . . . Green colored layer
15R . . . Red colored layer
16 . . . Color filter substrate
17 . . . Upper polarizer
20 . . . Touch panel
20S . . . Manipulation surface
21 . . . Touch sensor electrode
21D . . . Drive portion
21S . . . Sensing section
21U . . . Unit region
22 . . . Cover layer
23 . . . Transparent adhesive layer
31 . . . Transparent substrate 31A . . . A wiring
31B . . . B wiring
31C . . . C wiring
31D . . . D wiring
31E . . . E wiring
31DD . . . Drive dummy part
31DP . . . Drive electrode
31DPa . . . Drive capacitive electrode part
31DPb . . . Drive connecting part
31P . . . Pad
31RP, 33RP . . . Reference pattern element
31RPs, 33RPs . . . Starting point pattern element
31S . . . Drive surface
32 . . . Transparent adhesive layer
33 . . . Transparent dielectric substrate
33P . . . Pad
33S . . . Sensing surface
33SD . . . Sensing dummy part
33SP . . . Sensing electrode
33SPa . . . Sensing capacitive electrode part
33SPb . . . Sensing connecting part
34 . . . Selection circuit
35 . . . Detection circuit
35a . . . Signal acquiring section
35b . . . Signal processing section
36 . . . Control unit
41, 61 . . . Drive electrode wire
42, 62 . . . Drive dummy wire
42a, 52a . . . Intra-dummy gap
43, 63 . . . Drive pattern group
44, 64 . . . Drive gap
45, 55 . . . Electrode part gap
46, 56 . . . Electrode wire gap
47, 57 . . . Dummy wire gap
51, 71 . . . Sensing electrode wire
52, 72 . . . Sensing dummy wire
53, 74 . . . Sensing pattern group
54, 73 . . . Sensing gap
Lm . . . Primary wire
Ls . . . Secondary wire
Ps . . . Secondary end point
Lcd . . . Drive connecting wire
Lcs . . . Sensing connecting wire
Pa1 . . . First auxiliary end point
Pa2 . . . Second auxiliary end point
Pm1 . . . First primary end point
Pm2 . . . Second primary end point Obviously, numerous modifications and variations of the present invention are possible in light of the above teachings. It is therefore to be understood that within the scope of the appended claims, the invention may be practiced otherwise than as specifically described herein.

What is claimed is:

1. A touch sensor electrode, comprising:
a transparent dielectric substrate having a first surface and a second surface opposite to the first surface;
a plurality of first electrodes arrayed on the first surface along a second direction intersecting a first direction, each of the first electrodes being a set of first electrode wires, each of the first electrodes including a plurality of first capacitive electrode parts arrayed along the first direction and first connecting parts each connecting between the first capacitive electrode parts adjacent to each other;
a plurality of second electrodes arrayed on the second surface along the first direction, each of the second electrodes being a set of second electrode wires, each of the second electrodes including a plurality of second capacitive electrode parts arrayed along the second direction and second connecting parts each connecting between the second capacitive electrode parts adjacent to each other;
a plurality of first dummy parts each including a plurality of first dummy wires, each of the first dummy parts being separated from the first electrodes and located between two of the first electrodes adjacent to each other on the first surface; and
a plurality of second dummy parts each including a plurality of second dummy wires, each of the second dummy parts being separated from the second electrodes and located between two of the second electrodes adjacent to each other on the second surface,
wherein in plan view perpendicular to the transparent dielectric substrate, the first capacitive electrode parts face respective second dummy parts, and the second capacitive electrode parts face respective first dummy parts,
in the plan view, a combination of the first electrode wires and the second dummy wires forms a first section of a lattice pattern, and the first electrode wires form line segments different from line segments formed by the second dummy wires in the lattice pattern, and
in the plan view, a combination of the second electrode wires and the first dummy wires forms a second section of the lattice pattern, and the second electrode wires form line segments different from line segments formed by the first dummy wires in the lattice pattern,
wherein, in the plan view, the first electrodes, the first dummy parts, the second electrodes, and the second dummy parts have a same hue, and the first electrodes and the first dummy parts are different from the second electrodes and the second dummy parts in at least one of brightness and saturation.

2. The touch sensor electrode of claim 1, wherein the lattice pattern includes a plurality of lattice units,
each of the lattice units includes four line segments,
a part of the first electrode wire and a part of the second dummy wire are included in four line segments in the first section of the lattice pattern, and
a part of the second electrode wire and a part of the first dummy wire are included in four line segments in the second section of the lattice pattern.

3. The touch sensor electrode of claim 2, wherein the lattice pattern includes a lattice unit having a square shape,
each of the first electrode wires and each of the second dummy wires include a plurality of reference pattern elements,
each of the reference pattern elements includes a primary wire and a secondary wire such that the primary wire extends along an extending direction forming an angle relative to a reference direction and has a length twice as long as a length of a side of the lattice unit, and that the secondary wire extends along a direction perpendicular to the extending direction and has a length equal to the length of the side of the lattice unit,
in each of the first electrode wires, the reference direction is the second direction, and the reference pattern elements are arrayed along the first direction, and
in each of the second dummy wires, the reference direction is the first direction, and the reference pattern elements are arrayed along the second direction.

4. A touch panel, comprising:
the touch sensor electrode of claim 3;
a cover layer that covers the touch sensor electrode; and a peripheral circuit configured to measure electrostatic capacitance across the second electrodes.

5. A touch panel, comprising:
the touch sensor electrode of claim 2;
a cover layer that covers the touch sensor electrode; and
a peripheral circuit configured to measure electrostatic capacitance across the second electrodes.

6. A display device, comprising:
a display panel configured to display information;
the touch panel of claim 5; and
a drive circuit configured to drive the touch panel,
wherein the touch panel is configured to transmit the information displayed on the display panel.

7. The touch sensor electrode of claim 1, wherein the lattice pattern includes a lattice unit having a square shape,
each of the first electrode wires and each of the second dummy wires include a plurality of reference pattern elements,
each of the reference pattern elements includes a primary wire and a secondary wire such that the primary wire extends along an extending direction forming an angle relative to a reference direction and has a length twice as long as a length of a side of the lattice unit, and that the secondary wire extends along a direction perpendicular to the extending direction and has a length equal to the length of the side of the lattice unit,
in each of the first electrode wires, the reference direction is the second direction, and the reference pattern elements are arrayed along the first direction, and
in each of the second dummy wires, the reference direction is the first direction, and the reference pattern elements are arrayed along the second direction.

8. The touch sensor electrode of claim 7, wherein each of the second electrode wires and each of the first dummy wires include the reference pattern elements,
in each of the second electrode wires, the reference direction is the first direction, and the reference pattern elements are arrayed along the second direction, and
in each of the first dummy wires, the reference direction is the second direction, and the reference pattern elements are arrayed along the first direction.

9. A touch panel, comprising:
the touch sensor electrode of claim 8;
a cover layer that covers the touch sensor electrode; and
a peripheral circuit configured to measure electrostatic capacitance across the second electrodes.

10. A display device, comprising:
a display panel configured to display information;
the touch panel of claim 9; and
a drive circuit configured to drive the touch panel,
wherein the touch panel is configured to transmit the information displayed on the display panel.

11. A display device, comprising:
a display panel configured to display information;
the touch panel of claim 4; and
a drive circuit configured to drive the touch panel,
wherein the touch panel is configured to transmit the information displayed on the display panel.

12. The touch sensor electrode of claim 7, wherein the angle is greater than 0° and smaller than 180°.

13. The touch sensor electrode of claim 12, wherein the first direction and the second direction are perpendicular to each other,
a straight line passing through a center portion in the second direction of each of the first electrodes is a first straight line,
a straight line passing through a center portion in the first direction of each of the second electrodes is a second straight line,
a unit region in a rectangular shape is defined by two of the first straight lines adjacent to each other and two of the second straight lines adjacent to each other,
in the unit region, the reference pattern element located at an end in the first direction among the reference pattern elements included in each of the first electrodes wires is a first starting point pattern element, and the reference pattern element located at an end in the second direction among the reference pattern elements included in each of the second electrodes wires is a second starting point pattern element,
the first starting point pattern elements are positioned along the first direction in each of the unit regions,
the second starting point pattern elements are positioned along the second direction in each of the unit regions,
the reference pattern elements connected to one of the first starting point pattern elements extend towards another one of the first starting point pattern elements in the unit region adjacent in the first direction, and
the reference pattern elements connected to one of the second starting point pattern elements extends towards another one of the second starting point pattern elements in the unit region adjacent in the second direction.

14. The touch sensor electrode of claim 1, wherein in the plan view, the first electrodes and the first dummy parts have a same color attribute, and the first electrodes are different from the second electrodes and the second dummy parts in color attribute.

15. The touch sensor electrode of claim 1, wherein in the plan view, the first capacitive electrode part and the second capacitive electrode part are separated with electrode part gaps formed therebetween, and
the first dummy part has a part located in at least one of the electrode part gaps.

16. The touch sensor electrode of claim 1, wherein in the plan view, the first capacitive electrode part and the second capacitive electrode part are separated with electrode part gaps formed therebetween, and
the second dummy part has a part located in at least one of the electrode part gaps.

17. A touch panel, comprising:
the touch sensor electrode of claim 1;
a cover layer that covers the touch sensor electrode; and
a peripheral circuit configured to measure electrostatic capacitance across the second electrodes.

18. A display device, comprising:
a display panel configured to display information;
the touch panel of claim 17; and
a drive circuit configured to drive the touch panel,
wherein the touch panel is configured to transmit the information displayed on the display panel.

19. A touch sensor electrode, comprising:
a transparent dielectric substrate having a first surface and a second surface opposite to the first surface;
a plurality of first electrodes arrayed on the first surface along a second direction intersecting a first direction, each of the first electrodes being a set of first electrode wires, each of the first electrodes including a plurality of first capacitive electrode parts arrayed along the first direction and first connecting parts each connecting between the first capacitive electrode parts adjacent to each other;

a plurality of second electrodes arrayed on the second surface along the first direction, each of the second electrodes being a set of second electrode wires, each of the second electrodes including a plurality of second capacitive electrode parts arrayed along the second direction and second connecting parts each connecting between the second capacitive electrode parts adjacent to each other;

a plurality of first dummy parts each including a plurality of first dummy wires, each of the first dummy parts being separated from the first electrodes and located between two of the first electrodes adjacent to each other on the first surface; and a plurality of second dummy parts each including a plurality of second dummy wires, each of the second dummy parts being separated from the second electrodes and located between two of the second electrodes adjacent to each other on the second surface, wherein in a plan view perpendicular to the transparent dielectric substrate, the first capacitive electrode parts face respective second dummy parts, and the second capacitive electrode parts face respective first dummy parts, in the plan view, a combination of the first electrode wires and the second dummy wires forms a first section of a lattice pattern, and the first electrode wires form line segments different from line segments formed by the second dummy wires in the lattice pattern, and in the plan view, a combination of the second electrode wires and the first dummy wires forms a second section of the lattice pattern, and the second electrode wires form line segments different from line segments formed by the first dummy wires in the lattice pattern, wherein the lattice pattern includes a lattice unit having a square shape, each of the first electrode wires and each of the second dummy wires include a plurality of reference pattern elements, each of the reference pattern elements includes a primary wire and a secondary wire such that the primary wire extends along an extending direction forming an angle relative to a reference direction and has a length twice as long as a length of a side of the lattice unit, and that the secondary wire extends along a direction perpendicular to the extending direction and has a length equal to the length of the side of the lattice unit, in each of the first electrode wires, the reference direction is the second direction, and the reference pattern elements are arrayed along the first direction, and in each of the second dummy wires, the reference direction is the first direction, and the reference pattern elements are arrayed along the second direction.

20. A touch sensor electrode, comprising:

a transparent dielectric substrate having a first surface and a second surface opposite to the first surface;

a plurality of first electrodes arrayed on the first surface along a second direction intersecting a first direction, each of the first electrodes being a set of first electrode wires, each of the first electrodes including a plurality of first capacitive electrode parts arrayed along the first direction and first connecting parts each connecting between the first capacitive electrode parts adjacent to each other;

a plurality of second electrodes arrayed on the second surface along the first direction, each of the second electrodes being a set of second electrode wires, each of the second electrodes including a plurality of second capacitive electrode parts arrayed along the second direction and second connecting parts each connecting between the second capacitive electrode parts adjacent to each other;

a plurality of first dummy parts each including a plurality of first dummy wires, each of the first dummy parts being separated from the first electrodes and located between two of the first electrodes adjacent to each other on the first surface; and a plurality of second dummy parts each including a plurality of second dummy wires, each of the second dummy parts being separated from the second electrodes and located between two of the second electrodes adjacent to each other on the second surface, wherein in a plan view perpendicular to the transparent dielectric substrate, the first capacitive electrode parts face respective second dummy parts, and the second capacitive electrode parts face respective first dummy parts, in the plan view, a combination of the first electrode wires and the second dummy wires forms a first section of a lattice pattern, and the first electrode wires form line segments different from line segments formed by the second dummy wires in the lattice pattern, and in the plan view, a combination of the second electrode wires and the first dummy wires forms a second section of the lattice pattern, and the second electrode wires form line segments different from line segments formed by the first dummy wires in the lattice pattern, wherein the lattice pattern includes a plurality of lattice units, each of the lattice units includes four line segments, a part of the first electrode wire and a part of the second dummy wire are included in four line segments in the first section of the lattice pattern, and a part of the second electrode wire and a part of the first dummy wire are included in four line segments in the second section of the lattice pattern, wherein the lattice pattern includes a lattice unit having a square shape, each of the first electrode wires and each of the second dummy wires include a plurality of reference pattern elements, each of the reference pattern elements includes a primary wire and a secondary wire such that the primary wire extends along an extending direction forming an angle relative to a reference direction and has a length twice as long as a length of a side of the lattice unit, and that the secondary wire extends along a direction perpendicular to the extending direction and has a length equal to the length of the side of the lattice unit, in each of the first electrode wires, the reference direction is the second direction, and the reference pattern elements are arrayed along the first direction, and in each of the second dummy wires, the reference direction is the first direction, and the reference pattern elements are arrayed along the second direction.

* * * * *

UNITED STATES PATENT AND TRADEMARK OFFICE
CERTIFICATE OF CORRECTION

PATENT NO. : 10,126,876 B2  
APPLICATION NO. : 15/368470  
DATED : November 13, 2018  
INVENTOR(S) : Yasunori Hashida et al.

Page 1 of 1

It is certified that error appears in the above-identified patent and that said Letters Patent is hereby corrected as shown below:

On the Title Page

Item (73), the Assignee's information is incorrect. Item (73) should read:  
--(73) Assignee: VTS-Touchsensor Co. Ltd., Higashiomi-shi (JP)--

Signed and Sealed this  
Tenth Day of September, 2019

Andrei Iancu  
*Director of the United States Patent and Trademark Office*